United States Patent
Petrov

(10) Patent No.: US 10,747,948 B1
(45) Date of Patent: Aug. 18, 2020

(54) VIDEO ANNOTATION SYSTEM

(71) Applicant: Google Inc., Mountain View, CA (US)

(72) Inventor: Tsvetomir Petrov Petrov, Redwood City, CA (US)

(73) Assignee: Google LLC, Mountain View, CA (US)

( * ) Notice: Subject to any disclaimer, the term of this patent is extended or adjusted under 35 U.S.C. 154(b) by 142 days.

(21) Appl. No.: 15/707,835

(22) Filed: Sep. 18, 2017

Related U.S. Application Data

(63) Continuation of application No. 13/563,055, filed on Jul. 31, 2012, now Pat. No. 9,767,087.

(51) Int. Cl.
*G06F 40/169* (2020.01)

(52) U.S. Cl.
CPC .................... *G06F 40/169* (2020.01)

(58) Field of Classification Search
CPC .............................. G06F 17/241; G06F 40/169
See application file for complete search history.

(56) References Cited

U.S. PATENT DOCUMENTS

| | | | | |
|---|---|---|---|---|
| 2003/0081000 A1* | 5/2003 | Watanabe | ............. | G06F 16/957 715/751 |
| 2006/0087987 A1* | 4/2006 | Witt | ......... | H03M 7/30 370/260 |
| 2008/0098294 A1* | 4/2008 | Le | ......... | G06F 17/241 715/230 |
| 2009/0297118 A1 | 12/2009 | Fink et al. | | |
| 2010/0023851 A1 | 1/2010 | Schormann | | |
| 2010/0070878 A1 | 3/2010 | Amento et al. | | |
| 2010/0072957 A1 | 3/2010 | Bertin | | |
| 2010/0313113 A1 | 12/2010 | Chen et al. | | |
| 2010/0318893 A1 | 12/2010 | Matthews et al. | | |
| 2011/0258526 A1 | 10/2011 | Supakkul et al. | | |
| 2011/0295851 A1 | 12/2011 | El-Saban et al. | | |
| 2012/0072957 A1* | 3/2012 | Cherukuwada | .. | H04N 21/23412 725/93 |
| 2013/0022330 A1 | 1/2013 | Carter et al. | | |

OTHER PUBLICATIONS

Smith, Tony "Third Voice slammed for 'defacing' Web sites", The Register Biting the hand that fees IT, Jun. 11, 1999, 3 pages, London; accessed at http://www.theregister.co.us/1999/06/11/third_voice_slammed_for_defacing/ on Dec. 28, 2015.

\* cited by examiner

*Primary Examiner* — Jennifer N To
*Assistant Examiner* — Ashley M Fortino
(74) *Attorney, Agent, or Firm* — Lowenstein Sandler LLP

(57) ABSTRACT

A system and method for annotating video content is disclosed. The method receives, from a first client device of an annotating user, annotation data that includes annotations and specifies time portions of a video to include the annotations. The method also receives, from a second client device of a viewing user, a request of the viewing user to view the video with the annotations. The request of the viewing user is associated with a preference of the viewing user to display or hide the annotation during particular time portions of the video while the video is played. Responsive to the request, the method transmits the video with the annotations to the second client device for presentation of the video with the annotations in accordance with the annotation data of the annotating user.

19 Claims, 11 Drawing Sheets

VIDEO ANNOTATION SYSTEM

RELATED APPLICATION

This application is a continuation application of U.S. patent application Ser. No. 13/563,055, filed on Jul. 31, 2012, the entire contents of which are hereby incorporated by reference.

BACKGROUND

The specification relates to a data management system and, more specifically, a system for annotating a video.

Numerous websites host videos for viewing by users. A video hosting site manages videos that are accessed by clients. Publishers upload video content to the video hosting site. The video hosting site hosts videos uploaded by publishers for viewing by the client.

Users may want to share comments and thoughts about videos with their friends or other users while watching the video. They may want to target these comments at specific time portions and/or specific areas of the video content. Users may also want to use rich media such as pictures, videos, audio or drawings as part of their comments. When users watch the video, they may want to have other users' comments aggregated or filtered according to their preferences. They may also have preferences as to when, where and what type of comments are shown while the video is being played.

A first problem present in existing video hosting sites is that comments cannot be added to streaming or live content.

A second problem in existing video hosting sites is that these sites do not allow for multiple dynamic modifications of comments depending on users' preferences.

SUMMARY

Embodiments disclosed herein provide a system and method for annotating video content. A client device comprises a browser. The browser comprises an annotation module. The system comprises a communication module, a monitor module and a sensor module. The communication module is communicatively coupled to a network to receive the video content. The monitor module is communicatively coupled to the communication module to receive an input and derive an annotation event. The sensor module is communicatively coupled to the monitor module to receive annotation data for annotating the video content. The annotation data comprises position data, time data and annotation content data.

Also disclosed is a method for generating an annotation for video content. An embodiment of the method for generating an annotation for video content comprises receiving annotation data and generating the annotation for the video content based at least in part on the annotation data. In one embodiment, the annotation data comprises position data, time data and annotation content data. In another embodiment, the generated annotation comprises annotation content data that is in one or more positions as specified by the position data and in one or more time portions of the video content as specified by the time data.

A method for showing an annotation to a user is also disclosed. An embodiment of the method for showing an annotation to a user comprises receiving data describing a user's preference about viewing an annotation, retrieving annotation data based at least in part on the data describing the user's preference about viewing an annotation and generating an annotation based at least in part on the annotation data. In one embodiment, a user's preference about viewing an annotation indicates showing or hiding certain types of annotations during certain time portions and in certain positions of the video.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
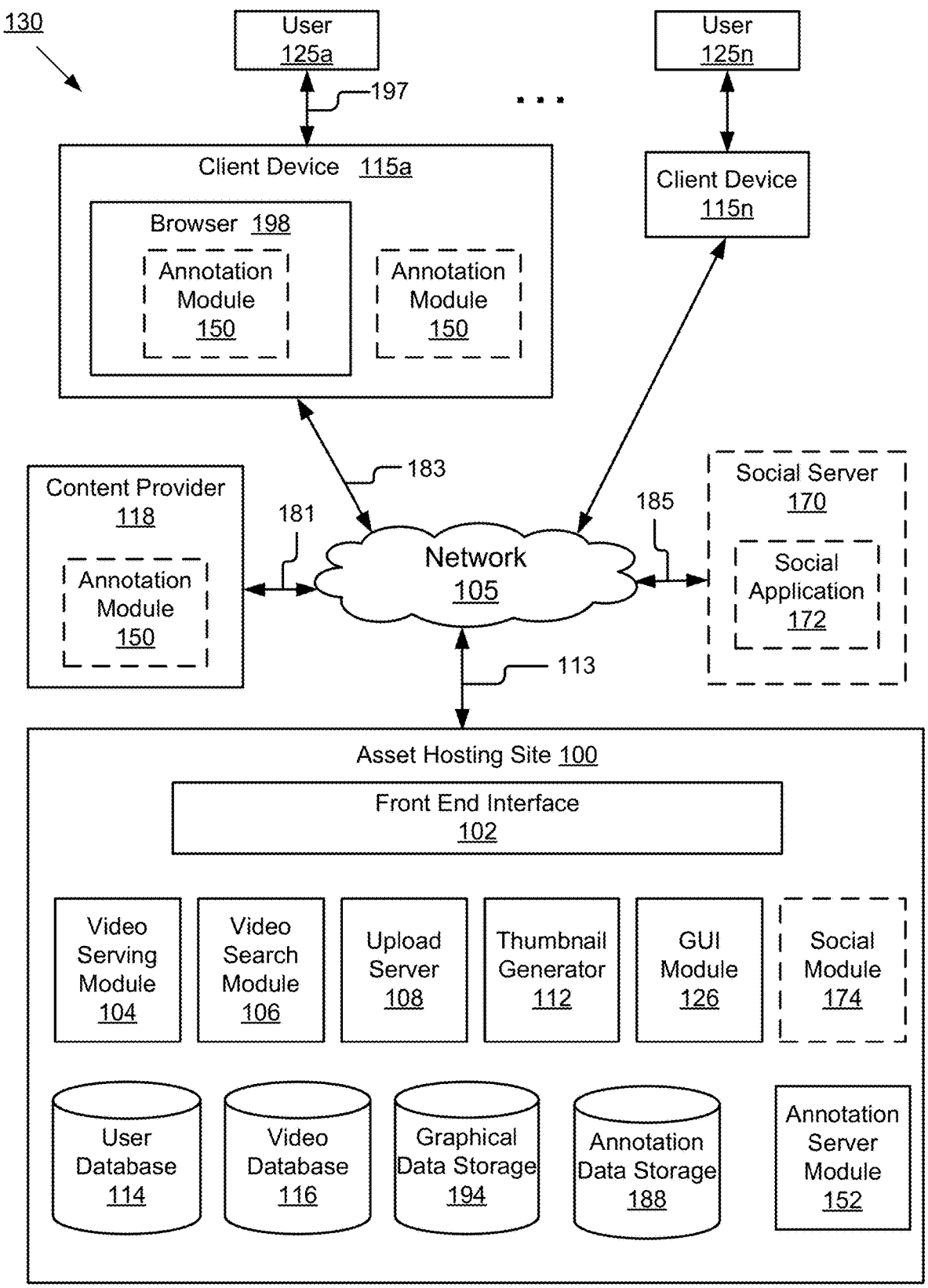
FIG. 1 is a high-level block diagram illustrating one embodiment of a system for providing annotation data for video content and generating an annotation for video content.

A system and method for annotating video content is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable storage medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

Finally, embodiments described herein include collection of data describing a user and/or activities of users. In one embodiment, such data is only collected upon the user providing consent to the collection of this data. In some implementations, a user is prompted to explicitly allow data collection. Further, the user may opt-in or opt-out of participating in such data collection activities. In one embodiment, the collected data is anonymized prior to performing any analysis to obtain any statistical patterns so that the identity of the user cannot be determined from the collected data.

System Overview

FIG. 1 illustrates a block diagram of a system 130 for annotating video content according to one embodiment. The illustrated embodiment of the system 130 includes client devices 115a, 115n (also referred to collectively or individually as client devices 115) that are accessed by users 125a, 125n (also referred to collectively or individually as client devices 125), a content provider 118, an asset hosting site 100 and a social server 170. The social server 170 is depicted in FIG. 1 using a dotted line to indicate that it is an optional feature of the system 130. In the illustrated embodiment, these entities are communicatively coupled via a network 105. For example, the asset hosting site 100, the content provider 118, the social server 170 and the client devices 115 are communicatively coupled to one another via a network 105 to facilitate sharing of information (e.g., annotated video content) between users 125 of client devices 115.

Although one content provider 118, two client devices 115, one social server 170 and one asset hosting site 100 are illustrated in FIG. 1, persons having ordinary skill in the art will recognize that any number of content providers 118, client devices 115, social servers 170 and asset hosting sites 100 can be communicatively coupled to the network 105. Furthermore, while one network 105 is coupled to the client devices 115, the content provider 118, the asset hosting site 100 and the social server 170, persons having ordinary skill in the art will appreciate that any number of networks 105 can be connected to the client devices 115, the content provider 118, the asset hosting site 100 and the social server 170.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, e-mail, etc. In yet another embodiment, all or some of the links in the network 105 are encrypted using conventional encryption technologies such as secure sockets layer (SSL), secure HTTP and/or virtual private networks (VPNs).

In the illustrated embodiment, the content provider 118 is communicatively coupled to the network 105 via signal line 181. The client device 115a is coupled to the network 105 via signal line 183. The user 125a interacts with the client device 115a as represented by signal line 197. Client device 115n and user 125n are coupled and interact in a similar manner. The social server 170 is communicatively coupled to the network 105 via signal line 185. The asset hosting site 100 is communicatively coupled to the network 105 via signal line 113.

The social server 170 is a hardware server that is configured to host a social network site. The social network site can be any social network site. The social server 170 contains a social application 172. The social application 172 includes code and routines stored on a non-transitory computer-readable memory (not pictured) of the social server 170. The social application 172 provides a social network site when executed by a processor (not pictured) of the social server 170. A social network site provides a social network that is any type of social structure where the users 125 are connected by a common feature, for example, Google Plus. The common feature includes explicitly defined relationships and relationships implied by social connections with other users 125, such as friendship, family, work, an interest, etc. A user 125n who has one or more common features with a user 125a is referred to herein as a "social contact" of the user 125a. In one embodiment, the relationships are defined in a social graph (not pictured) included in the social server 170. The social graph is a mapping of all users 125 in a social network and how they are related to each other.

The social server 170 is depicted in FIG. 1 using a dotted line to indicate that it is an optional feature of the system 130. Accordingly, in one embodiment the system 130 does not include the social server 170 and the social application 172.

The asset hosting site 100 is any system that allows users to access video content via searching and/or browsing interfaces. An example of an asset hosting site 100 is the YOUTUBE™ website, found at www.youtube.com. Other video hosting sites are known as well, and are adapted to operate according to the teachings disclosed herein. It will be understood that the term "website" represents any computer system adapted to serve content using any internet working protocols, and is not intended to be limited to content uploaded or downloaded via the Internet or the HTTP protocol.

In one embodiment, sources of the video content on the asset hosting site 100 are from uploads of videos by users, searches or crawls of other websites or databases of videos, pre-specified sources specified by an administrator, sources specified and/or selected by users 125, or the like, or any combination thereof. For example, the asset hosting site 100 is configured to allow upload of video content by users 125 and/or content providers 118. In another example, the asset hosting site 100 is configured to obtain videos from other sources by crawling such sources or searching such sources in real time. In yet another example, the asset hosting site 100 is configured to obtain videos from streaming video sources such as security cameras, traffic cameras, live-event feeds, etc.

To simplify and clarify the present description, the video content files received and shared by the asset hosting site 100 will be referred to as videos, video content, video files, or video items. Persons having ordinary skill in the art will recognize that the asset hosting site 100 can receive and share content of any media type and file type. For example, the asset hosting site 100 shares a content file such as a video, an audio, a combination of video and audio, an image such as a JPEG or GIF file and/or a text file, et\c.

The asset hosting site 100 is communicatively coupled to the network 105 via signal line 113. In the illustrated embodiment, the asset hosting site 100 includes: a front end interface 102; a video serving module 104; a video search module 106; an upload server 108; a thumbnail generator 112; a GUI module 126; a user database 114; a video database 116; a graphical data storage 194; an annotation data storage 188; an annotation server module 152 and a social module 174. The components of the asset hosting site 100 are communicatively coupled to one another. The social module 174 is depicted in FIG. 1 using a dashed line to indicate that it is an optional feature of the asset hosting site 100. Other conventional features, such as firewalls, load balancers, authentication servers, application servers, failover servers, site management tools, and so forth are not shown so as not to obscure the feature of the system.

In one embodiment, the illustrated components of the asset hosting site 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the asset hosting site 100 are performed by one or more client devices 115 and/or content providers 118 in other embodiments if appropriate. In one embodiment, the functionality attributed to a particular component is performed by different or multiple components operating together.

Each of the various servers and modules on the asset hosting site 100 is implemented as a server program executing on a server-class computer comprising one or more central processing units ("CPU," or "CPUs" if plural), memory, network interface, peripheral interfaces, and other well-known components. In one embodiment, the computers themselves run an open-source operating system such as LINUX, have one or more CPUs, 1 gigabyte or more of memory, and 100 gigabytes or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in one or more tangible, non-transitory computer-readable storage mediums (e.g., random access memory ("RAM"), flash, solid-state drive ("SSD"), hard disk drive, optical/magnetic media, etc.).

The front end interface 102 is an interface that handles communication with content provider 118 and client devices 115 via the network 105. For example, the front end interface 102 receives video files uploaded from the content provider 118 and/or users 125 of the client devices 115 and delivers the video files to the upload server 108. In one embodiment, the front end interface 102 receives requests from users 125 of the client devices 115 and delivers the requests to the other components of the asset hosting site 100 (e.g., the video search module 106, the video serving module 104, etc.). For example, the front end interface 102 receives a video search query from a user 125 and sends the video search query to the video search module 106.

In one embodiment, the front end interface 102 receives an annotation event from the client device 115. As described in more detail below, in one embodiment an annotation event indicates that a user 125 wants to provide an annotation for a video. The front end interface 102 delivers the annotation event to the annotation server module 152. In one embodiment, the front end interface 102 receives annotation data from users 125 of the client device 115. The front end interface 102 stores the annotation data in the annotation data storage 188 for later use. In another embodiment, the front end interface 102 delivers the annotation data to the annotation server module 152.

In one embodiment, the front end interface 102 receives data for generating an annotation overlay from the annotation server module 152. An annotation overlay is a graphic that overlays a video and displays one or more annotations. For example, an annotation overlay has an appearance similar to an advertising overlay, except that an annotation overlay depicts an annotation for a video provided by a user 125. In one embodiment, the annotation overlay occurs at a specified time and place in the video. An example of an annotation overlay is depicted in FIG. 7B, element 760. For the purpose of simplicity, the data for generating the annotation overlay is described as "an annotation overlay" or "the annotation overlay."

The front end interface 102 delivers the annotation overlay to the client device 115. In another embodiment, the front end interface 102 receives a social notification from the social module 174. The front end interface 102 delivers the social notification to the social server 170. In yet another embodiment, the front end interface 102 receives data describing users' 125 preferences about viewing an annotation for videos from the client device 115. The front end interface 102 stores the data describing users' 125 preferences about viewing an annotation in the user database 114.

The upload server 108 receives video files from the content provider 118 and/or a user 125 operating on a client device 115 via the front end interface 102. In one embodiment, the upload server 108 processes the video files and stores the video files in the video database 116. For example, the upload server 108 assigns a video identifier (video ID) to a video and stores the video and the video ID in the video database 116. Further examples of processing a video file by the upload server 108 include performing one or more of: formatting; compressing; metadata tagging; and content analysis, etc.

The video database 116 is a storage system that stores video files shared by the asset hosting site 100 with the users 125. In one embodiment, the video database 116 stores the video files processed by the upload server 108. In another embodiment, the video database 116 stores metadata of the video files. For example, the video database 116 stores one or more of: a title; a video ID; description; tag information; and administrative rights of a video file. The administrative rights of a video file include one or more of: the right to delete the video file; the right to edit information about the video file; and the right to associate the video file with an advertisement, etc.

In one embodiment, at least some of the metadata of a video file is provided by the content provider 118 and/or the user 125. For example, the content provider 118 and/or the user 125 provide a title and/or a short description of a video when uploading the video to the asset hosting site 100. In another embodiment, the content provider 118 and/or the user 125 also provide permission data that indicates whether a video file uploaded by the content provider 118 and/or the user 125 is permitted to be annotated by other users 125. In one embodiment, the video database 116 stores the permission data for videos. In another embodiment, the permission data is stored in the annotation data storage 188. The permission data will be described in further detail below with reference to FIG. 3.

The video search module 106 includes code and routines that, when executed by a processor (not pictured), processes any search queries received by the front end interface 102 from a user 125 using a client device 115. A search query from a user 125 includes search criteria such as keywords that, for example, identify videos the user 125 is interested in viewing. In one embodiment, the video search module 106 uses the search criteria to query the metadata of video files stored in the video database 116. The video search module 106 returns the search results to the client device 115 via the front end interface 102. For example, if a user 125 provides a keyword search query to the video search module 106 via the front end interface 102, the video search module 106 identifies videos stored in the video database 116 matching the keyword and returns search results (e.g., video IDs, titles, descriptions, thumbnails of the identified videos) to the user 125 via the front end interface 102.

In one embodiment, the video search module 106 also query the metadata of video files stored in the video database 116 responsive to one or more events other than a search query. For example, the video search module 106 receives a browsing or navigation request from a user 125. The video search module 106 query the metadata of one or more video files in relevance with the browsing or navigation request. The video search module 106 returns the query results to the client device 115 via the front end interface 102. In other examples, the one or more events include feeds and/or suggestions of videos (such as suggestions of videos by emails), embedded links to videos in one or more other websites, etc.

The video serving module 104 includes code and routines that, when executed by a processor (not pictured), processes requests for videos and serves videos to client devices 115. For example, the video serving module 104 receives a request for viewing a video from a user 125 of the client device 115, retrieves the video from the video database 116 based at least in part on the request and presents the video to the client device 115 via the front end interface 102.

In one embodiment, the video serving module 104 receives a request from a client device 115 to access a video when the user 125 clicks on a link to the video. For example, the video serving module 104 receives a request from a mobile device (such as a mobile phone, a tablet computer, etc.) to access a video when the user 125 clicks on a link to the video displayed on the mobile device. The request received from the client device 115 includes the video ID of the video. In one embodiment, the video ID is included automatically in the request once the user 125 clicks on the link for the video. The video serving module 104 uses the video ID to search and locate the video in the video database 116. Once the requested video is located, the video serving module 104 sends the video to the client device 115 via the front end interface 102. In one embodiment, the video serving module 104 also sends permission data with the video to the client device 115. For example, the video serving module 104 retrieves permission data associated with the requested video from the video database 116 or from the annotation data storage 188. The video serving module 104 sends the permission data with the requested video to the client device 115.

In one embodiment, the video is presented to the user 125 on a browser stored and executed by the client device 115. The browser optionally comprises a media player. Video content can be played back on the browser or a media player executed in the browser. Optionally, the media player is a standalone application stored and executed by the client device 115.

Metadata associated with the video such as the title and description of the video is also presented to the user 125. In one embodiment, permission data associated with the video is retrieved and analyzed by the client device 115. In one embodiment, the video serving module 104 stores the video ID of the video in the user database 114 after sending the video to the client device 115 so that a video viewing history of the user 125 is stored in the user database 114.

The user database 114 is a storage system that stores data and/or information associated with any user 125. For example, the user database 114 stores video IDs of video files uploaded by a user 125 so that a video uploading history of the user 125 is maintained in the user database 114. The user database 114 also stores video IDs of video files that the user 125 has accessed from the video database 116 for viewing so that a video viewing history for the user 125 is stored in the user database 114. In one embodiment, the user 125 is identified by using a unique user name and password and/or by using the user's 125 internet protocol address.

In one embodiment, the user database 114 stores data describing users' 125 preferences about viewing an annotation for videos. For example, the user database 114 stores data describing user's 125 choices of showing or hiding certain types of annotations. In another example, the user database 114 stores users' 125 preferences of viewing an annotation in certain positions inside or beside videos. In one embodiment, the user database 114 stores the users' 125 default preferences about viewing an annotation. In another embodiment, the user database 114 receives changed preferences from users 125 via the front end interface 102. The user database 114 stores the changed preference as default preference.

The thumbnail generator 112 includes code and routines that, when executed by a processor (not pictured), generates a thumbnail for a video. A thumbnail is an image that represents a video on the asset hosting site 100. For example, the thumbnail generator 112 analyzes the video and selects a frame from the video as the thumbnail. In one embodiment, the thumbnail generator 112 provides one or more images for the video and allows a publisher (e.g., a content provider 118 or a user 125 uploading the video using a client device 115) to select one image as the thumbnail. In one embodiment, the thumbnail also shows one or more annotations for a video. For example, the thumbnail generator 112 selects a frame from a video with an annotation overlay on the frame. The thumbnail generator 112 uses the frame with the annotation overlay as the thumbnail. In other embodiments, the thumbnail includes one or more indicators of the presence of one or more annotations.

The graphical data storage 194 is a storage system that stores graphical code for generating graphical user interfaces ("GUIs") for display to the user 125 in the browser of the client device 115. For example, the graphical data storage 194 stores graphical data for displaying a screen on a display of the client device 115 that allows the user 125 to opt-out of the services provided by the monitor module 191.

The GUI module 126 includes code and routines that, when executed by a processor (not pictured), generates a user interface that displays information to a user and/or allows a user to input information via the user interface. In one embodiment, the GUI module 126 provides the functionality described below for receiving inputs from users 125 and/or displaying information to users 125. The GUI module 126 is communicatively coupled to the front end interface 102. The GUI module 126 retrieves graphical data from the graphical data storage 194 and transmits the graphical data to the front end interface 102. The front end interface 102 communicates with the network 105 to transmit the graphical data to a processor-based computing device communicatively coupled to the network 105.

For example, the front end interface 102 transmits the graphical data to one or more of the content provider 118 and client device 115. One or more of the content provider 118 and the client device 115 receives the graphical data and generates a GUI displayed on a display device (e.g., a monitor) communicatively coupled to the content provider 118 and/or the client device 115. The GUI is displayed on a display device and viewed by a human user (such as a user 125). The GUI includes one or more fields, drop down boxes or other conventional graphics used by the human user to provide inputs that are then transmitted to the asset hosting site 100 via the network 105. For example, the GUI is used by the users 125 to provide annotation data for a video. In another example, the GUI is used by the users 125 to provide their preferences about viewing an annotation for a video. For example, a user 125 chooses to show or hide certain types of annotations via the GUI.

Data inputted into the GUI is received by the front end interface 102 and stored in one or more of the video database 116, user database 114 and the annotation data storage 188. For example, annotation data inputted into the GUI is received by the front end interface 102 and stored in the annotation data storage 188. The user interface for receiving annotation data for a video from users 125 is described in more detail below with reference to FIG. 7A. In another example, data describing users' 125 preferences about viewing an annotation is received by the front end interface 102. In one embodiment, the front end interface 102 delivers the data describing users' 125 preferences about viewing the annotation to the annotation server module 152. In another embodiment, the front end interface 102 stores the data describing users' 125 preferences about viewing an annotation in the user database 114.

In one embodiment, the GUI module 126 retrieves one or more annotations for a video from the annotation data storage 188. In another embodiment, the GUI module 126 receives one or more annotations for a video from the annotation server module 152. For example, the GUI module 126 receives data for generating an annotation overlay for a video from the annotation server module 152. In one embodiment, the GUI module 126 generates a user interface displaying the video with the one or more annotations for users 125. For example, the GUI module 126 generates a user interface displaying the video with an annotation overlay. The user interface for displaying a video with one or more annotations is described in more detail below with reference to FIG. 7B.

In another embodiment, the GUI module 126 provides a user interface for displaying information to a user. For example the information includes a tutorial, terms and agreements, etc. In yet another embodiment, the GUI module 126 provides a user interface that displays information to a user 125 and allows the user to input information via the user interface.

In one embodiment, the GUI module 126 transmits graphical data to the client device 115 that causes the browser of the client device 115 to display a GUI that provides the user 125 with a graphical input that the user 125 can use to explicitly opt-in or opt-out of data collection by the asset hosting site 100 (and/or the first server 101). If the user 125 provides an input opting out of data collection, the asset hosting site 100 and/or the first server 101 does not collect data describing the user 125 or the user's 125 activities. In one embodiment, if the user opts to participate in the data collection, the asset hosting site 100 and/or the first server 101 anonymize any data collected describing the user 125 and the user's 125 activities so that the identity of the user 125 cannot be determined from the collected data. In one embodiment, the GUI includes a written description of a privacy policy that describes how the collected data is anonymized and how the collected data will be used.

The social module 174 includes code and routines that, when executed by a processor (not pictured), processes activities performed on the asset hosting site 100 and/or social network sites hosted by the social server 170. For example, the social module 174 monitors real-time social activities performed on the asset hosting site 100 and/or a social network site hosted by the social server 170 such as Google Plus. The social module 174 processes the social activities in real time.

In one embodiment, the social module 174 receives one or more user inputs for one or more social activities performed on the asset hosting site 100 and/or social network sites hosted by the social server 170. The one or more user inputs are associated with social activity information describing the one or more social activities. The social module 174 aggregates the social activity information based at least in part on the one or more user inputs to generate aggregated social activity information as an output. The social module 174 provides the aggregated social activity information to the users 125. In another embodiment, the social module 174 filters the social activity information based at least in part on the one or more user inputs. The social module 174 generates filtered social activity information as an output. The social module 174 provides the filtered social activity information to the users 125.

In one embodiment, the social module 174 retrieves information describing one or more social contacts of a user 125 from the social server 170. For example, the social module 174 retrieves information describing one or more social contacts of a user 125 from the social graph included in the social server 170. The social module 174 sends the information describing the one or more social contacts of the user 125 to the GUI module 126. The GUI module 126 generates a user interface using the information describing the one or more social contacts of the user 125. The user interface is used by the user 125 to provide social data. For example, the user interface including the information describing the one or more social contacts is used by the user 125 to choose which of the social contacts is allowed to see annotation for the video.

In one embodiment, the social module 174 receives social data inputted by users 125. For example, the client device 115 receives annotation data including social data from users 125. The client device 115 transmits the annotation data including social data to the annotation server module 152 via the network 105. The annotation server module 152 sends the social data to the social module 174.

In one embodiment, the social module 174 determines one or more social contacts allowed to see annotation for a video based at least in part on the social data. The social module 174 then generates one or more social notifications based on the one or more social contacts. The social module 174 transmits the one or more social notifications to the social server 170 to notify the one or more social contacts.

For example, the social module 174 determines, based at least in part on the social data, a group of friends authorized to see an annotation for a video. The user 125 who annotates a video authorizes one or more friends to see the annotation. The social data includes data describing which of the user's 125 friends are authorized to see the annotation. The social module 174 analyzes the social data and determines which of the user's 125 friends are authorized to see the annotation. The group of friends is connected to the user 125 through a social network site hosted by the social server 170. The social module 174 transmits a social notification for the group of friends to the social server 170. For example, the social notification includes "Your friend Abe annotated a video titled, 'Aliens attach Mountain View'." The social server 170 displays the social notification to the group of friends on the social network site.

In one embodiment, the social module 174 receives a request for data that describes a user's 125 preference about viewing an annotation. For example, when a user 125 operating on a client device 115 clicks on a link to a video, the client device 115 sends a request to the video serving module 104. The request indicates that the user 125 would like the video serving module 104 to serve the video to the client device 115. The client device 115 also sends a request to the social module 174 for retrieving data describing the user's 125 preference about viewing an annotation.

In one embodiment, the social module 174 retrieves data describing a user's 125 preference about viewing an annotation from the social server 170. For example, responsive to receiving a request for data that describes a user's 125 preference about viewing an annotation, the social module 174 retrieves the data describing the user's 125 preference about viewing an annotation from the social server 170. For example, the data indicates that the user 125 only allows one or more annotations of a certain type (such as a text annotation) to appear during a certain time portion of the video (such as during the first five minutes of the video) in a certain position (such as at the right lower corner of a media playback window included in the browser).

In one embodiment, the social module 174 transmits data describing a user's 125 preference about viewing an annotation to the annotation server module 152. The annotation server module 152 then provides one or more annotations to the user 125 based at least in part on the data describing the user's 125 preference for viewing an annotation.

The annotation data storage 188 is a storage system that stores annotation data received from users 125 of the client device 115 and/or content provider 118. In one embodiment, the annotation data is used to generate one or more annotations for video content. For example, the annotation data includes position data, time data and annotation content data. The position data, time data and annotation content data are used to generate one or more annotations for a video. In one embodiment, the annotation data also includes social data indicating who is allowed to see the one or more annotations. In another embodiment, the annotation data includes permission data indicating whether a video is permitted by the publisher or the owner to be annotated by other users 125. In one embodiment, the permission data is a separate data set and is not comprised within the annotation data. For example, the permission data is a separate data set stored in the annotation data storage 188 along with the annotation data. The annotation data storage 188 will be described in further detail below with reference to FIG. 3.

The annotation server module 152 includes code and routines that, when executed by a processor (not pictured), receives annotation data and generates one or more annotations for video content. In one embodiment, the annotation server module 152 receives an annotation event from the client device 115 via the front end interface 102. For example, the annotation event indicates that a user 125 requests to annotate a video before, during or after playback of the video. Once receiving the annotation event, the annotation server module 152 sends a request for GUI data to the GUI module 126. For example, the GUI data includes graphical data used to generate a GUI for a user 125 to provide annotation data such as annotation content, an annotation position and an annotation time portion. In one embodiment, the GUI module 126 retrieves GUI data from the graphical data storage 194. The GUI module 126 transmits the GUI data to the client device 115. The client device 115 generates a GUI used by a user 125 of the client device 115 to provide annotation data.

In one embodiment, the annotation server module 152 receives annotation data for a video from a user 125 of the client device 115. The annotation server module 152 stores the annotation data for the video in the annotation data storage 188. The user 125 who provides annotation data for a video is referred to herein as an "annotating user 125" for clarity and simplicity of description.

In one embodiment, the annotation server module 152 determines whether an annotation for the video generated based on the annotation data is permitted by the annotating user 125 to be viewed by other users 125 based at least in part on the annotation data. For example, the annotation data provided by an annotating user 125 includes social data indicating the users 125 who are allowed by the annotating user 125 to see an annotation generated based on the annotation data. The annotation server module 152 determines the users 125 based on the social data. For example, the users 125 allowed by the annotating user 125 to see the annotation includes variety of social contacts of the annotating user 125 such as friends of the annotating user 125, people in association with the annotating user 125 through the social server 170 and any users 125 who can access the video.

In one embodiment, the annotation server module 152 transmits social data to the social module 174. The social module 174 notifies social contacts of the annotating user 125 about the annotation by communicating with the social server 170. In one embodiment, the annotation server module 152 transmits one or more associations between a video, an annotating user 125 and social contacts of the annotating user 125 to the annotation data storage 188 for storage.

In one embodiment, the annotation server module 152 generates one or more annotations for a video based at least in part on the annotation data received from the client device 115. The one or more annotations include annotation content data (such as a text annotation, an emoticon, a drawing, an image, an audio and a video) in one or more positions and in one or more time portions of the video content specified by the annotation data. For example, an annotation is provided as an overlay. The annotation server module 152 adds annotation content as an overlay to a position and a time portion of the video content specified by the position data and the time data included in the annotation data.

For example, an annotating user 125 records a homemade video as annotation content data for a video titled, "Aliens Attack a Library." The annotating user 125 provides position data specifying a right corner inside the video content of, "Aliens Attack a Library." The time data specifies a time portion of the video such as from 3:00 to 3:45 (i.e., assume that the video content is 10 minutes in length, and that the time portion specified by the annotating user 125 is the 3:00 minute mark until the 3:45 minute mark). The annotation server module 152 therefore generates an annotation overlay based on the homemade video, the position data and the time data. The homemade video will appear as an annotation overlay during the time portion such as from 3:00 to 3:45 and on the right corner inside the video content of "Aliens Attack a Library."

In one embodiment, the annotation server module 152 transmits the annotation to the client device 115 via the front end interface. For example, the annotation server module 152 transmits the annotation overlay generated in the above example to the client device 115. The client device 115 displays the homemade video as an overlay on the right corner of the video content of, "Aliens Attack a Library," from 3:00 to 3:45. In another embodiment, the annotation server module 152 transmits the annotation to the annotation data storage 188 for storage.

In one embodiment, the annotation server module 152 receives data describing a user's 125 preference about viewing an annotation from the social module 174. For example, the social module 174 retrieves data describing the user's 125 preference about viewing an annotation from the social server 170 responsive to a request from the user 125 to view a video with annotation. The social module 174 transmits data describing the user's 125 preference about viewing an annotation to the annotation server module 152. The annotation server module 152 receives data describing the user's 125 preference about viewing an annotation from the social module 174.

In another embodiment, the annotation server module 152 receives data describing a user's 125 preference about viewing an annotation from the user 125 via the client device 115. For example, a user 125 makes certain sounds such as clapping hands. The client device 115 recognizes the sound as a request to change the user's 125 default preference of viewing one or more annotations such as a request to change the preference of showing or hiding one or more annotations. In other examples, a user 125 makes other actions such as providing an input to a touch screen of a client device 115, clicking or moving a mouse, typing on a keyboard, making other sounds, making a movement detected by a video capture device (such as a web camera), etc. The client device 115 recognizes these actions as requests to change the user's 125 preference for viewing one or more annotations. The client device 115 transmits the request of changing the default preference of viewing one or more annotations to the annotation server module 152. The annotation server module 152 receives the data describing the user's 125 preferences about viewing one or more annotations such as the requests for changing preferences of viewing one or more annotations from the client device 115.

In one embodiment, the annotation server module 152 receives data describing one or more pre-specified rules specified by a user 125 for viewing an annotation. For example, the annotation server module 152 receives data describing a pre-specified rule for viewing an annotation from a user 125 via the client device 115. In other examples, the annotation server module 152 receives data describing a pre-specified rule for viewing an annotation from the social module 174. In one embodiment, a pre-specified rule indicates a condition where an annotation will change in some way. For example, a pre-specified rule is that automatically minimizing or removing an annotation after the annotation has been present for a predetermined period of time (such as 10 seconds). In another example, a pre-specified rule is that automatically minimizing or removing an annotation if the volume of the annotation is above a certain level such as 50 decibel (db).

In other embodiments, a pre-specified rule indicates a user activity and a change of an annotation triggered by the user activity. For example, the user activity includes a mouse clicking, a mouse moving, a movement captured by an input device (such as waiving a hand), a sound captured by an input device (such as a whistle), etc. A change of an annotation triggered by a user activity includes disappearing, moving to one side of the video, moving to a client device 115 (such as a smart phone, a tablet computer, a television, etc), minimizing, appearing, starting to play, adding sounds, removing sounds, changing the volume of a sound, increasing the transparency of an annotation overlay, decreasing the transparency of an annotation overlay, etc. For example, when the client device 115 receives a user activity such as a whistle via an input device, the client device 115 sends data describing the user activity to the annotation server module 152. The annotation server module 152 receives the data describing the user activity. The annotation server module 152 also receives a pre-specified rule indicating a change of an annotation triggered by the user activity. The annotation server module 152 then determines a change of an annotation overlay such as increasing the transparency of the annotation overlay based on the data describing the user activity and the pre-specified rule.

In yet another example, a user 125 chooses to show or hide certain types of annotations during certain time portions and in certain positions of the video via a GUI. The client device 115 captures the choice of the user 125 on the GUI and transmits data describing the choice of the user 125 to the annotation server module 152. The annotation server module 152 receives the data describing the choice of the user 125 from the client device 115.

In one embodiment, the annotation server module 152 retrieves annotation data for the video from the annotation data storage 188 based at least in part on the data describing a user's 125 preference about viewing an annotation. The annotation server module 152 generates one or more annotations based on the annotation data. For example, the one or more annotations are provided as an annotation overlay. In one embodiment, the annotation server module 152 transmits the one or more annotations to the client device 115 to display the annotations with the video to the user 125. For example, the annotation server module 152 transmits an annotation overlay to the browser of the client device 115. The browser displays the annotation overlay on the video for the user 125.

In one embodiment, the annotation server module 152 generates one or more indications to remind users 125 of appearance of annotation. The one or more indications include visual indications, audio indications and indications related to sense of touch, smell and taste. For example, the annotation server module 152 retrieves graphical data from the graphical data storage 194. The annotation server module 152 generates a visual indication using the graphical data. For example, the visual indication is a navigation bar with time labels. The time labels are colored according to different types and sources of annotations. The navigation bar can be used by users 125 to scroll to any time of the video to watch any annotation they are interested in.

In another example, the annotation server module 152 generates an audio indication. The audio indication is, for example, an audio signal for generating one or more low volume beeps. In one embodiment, the annotation server module 152 also generates audio signals with different frequencies for annotations of different types or sources.

In yet another example, the annotation server module 152 generates a scroll bar using the graphical data retrieved from the graphical data storage 194. The scroll bar includes highlighted portions indicating vulgarity, violence or nudity portions of the video. In this way, parents can skip these portions for their children.

The client device 115 is any computing device. For example, the client device 115a, 115n is a personal computer ("PC"), smart phone, tablet computer (or tablet PC), etc. In other examples, the client device 115 is a processor-based television, monitor, projector, text display, speaker, etc., or any other processor-based device. One having ordinary skill in the art will recognize that other types of client devices 115 are possible. In one embodiment, the system 130 comprises a combination of different types of client devices 115. For example, a plurality of other client devices 115 is any combination of a personal computer, a smart phone, a tablet computer, a television, a monitor, a projector, a text display and a speaker. The user 125 is a human user of the client device 115.

The client device 115 comprises a browser 198. In one embodiment, the browser 198 includes code and routines stored in a memory (not pictured) of the client device 115 and executed by a processor (not pictured) of the client device 115. For example, the browser 198 is a browser application such as Google Chrome. In one embodiment, the browser 198 includes an annotation module 150.

The annotation module 150 is depicted in FIG. 1 using a dotted line to indicate that the annotation module 150 can be an element of any of the browser 198, the client device 115 and the content provider 118. In one embodiment, the annotation module 150 is an element of the content provider 118. In another embodiment, the annotation module 150 is an element of the client device 115 and not an element of the browser 198. Although the browser 198 and the annotation module 150 are shown in reference to the client device 115a, persons having ordinary skill in the art will recognize that any client device 115 may comprise these elements.

In one embodiment, the annotation module 150 includes code and routines that when executed by a processor (not pictured) in the client device 115 provides annotation data for video content. For example, the annotation module 150 receives annotation data for a video from users 125 of the client device 115 and/or content provider 118. The annotation module 150 provides the annotation data to the annotation server module 152 through the front end interface 102.

In one embodiment, the annotation module 150 receives video content from the asset hosting site 100 via the network 105. For example, when a user 125 clicks on a link to a video, the annotation module 150 receives the video content from the video serving module 104 via the front end interface 102. In one embodiment, the video content includes permission data indicating whether an annotation for the video content is permitted by an owner or a publisher of the video. The annotation module 150 determines whether an annotation for the video content is permitted based at least in part on the permission data. If the annotation for the video content is permitted, the annotation module 150 starts to monitor users' 125 activities. For example, the annotation module 150 monitors any activity captured by any input device such as a motion sensor, a camera, a microphone, a mouse, a presence-detecting device, a pointing device and a keyboard before, during and after playback of the video content.

In one embodiment, the annotation module 150 derives an annotation event. For example, the annotation event is a user activity captured by an input device before, during and after playback of the video content. An input device such as a sensor (e.g., a motion sensor), keyboard or mouse detects an input from the user. For example, the user 125 gestures in a way that indicates that the user 125 wants to annotate a video. The gesture includes any combination of a motion by the user (e.g., a hand wave or facial expression), a movement and/or click of the mouse or any combination of inputs provided to the keyboard. In other examples, the user 125 makes a sound, such as a whistle or any other sound, to indicate that the user 125 desires to add an annotation to the video content. The input device transmits this input to the annotation module 150. The annotation module 150 is communicatively coupled to a memory (not pictured) of the client 115 that stores data indicating one or more user activities that indicate that the user 125 wants to annotate the video content. The annotation module 150 analyses the input received from the input device to derive whether the user 125 wants to annotate the video content, thereby triggering an annotation event.

The annotation event indicates a request for annotating the video content. In one embodiment, responsive to deriving an annotation event, the annotation module 150 receives annotation data from a user 125 through an input device. The annotation data includes position data, time data and annotation content data. The annotation module 150 transmits the annotation data to the front end interface 102 of the asset hosting site 100 via the network 150.

In one embodiment, the annotation module 150 is included in the content provider 118. The content owner or publisher provides annotation data to its owned video content. For example, the annotation content data includes advertising content, promotional content and other content owner or publisher provided content. For example, a content owner only allows advertisements of a certain type (such as text) during a certain time portion (such as in the last one minute of the owner's video) in a certain area of the owner's video content (such as at the bottom of the video content). In another example, a publisher allows the showing of one advertisement for every five user annotations of a certain type (such as video) that is added. In one embodiment, the annotation module 150 included in the content provider 118 transmits the annotation data provided by the content owner or publisher to the annotation server module 152 via the front end interface 102.

Annotation Module 150

Figure 2:
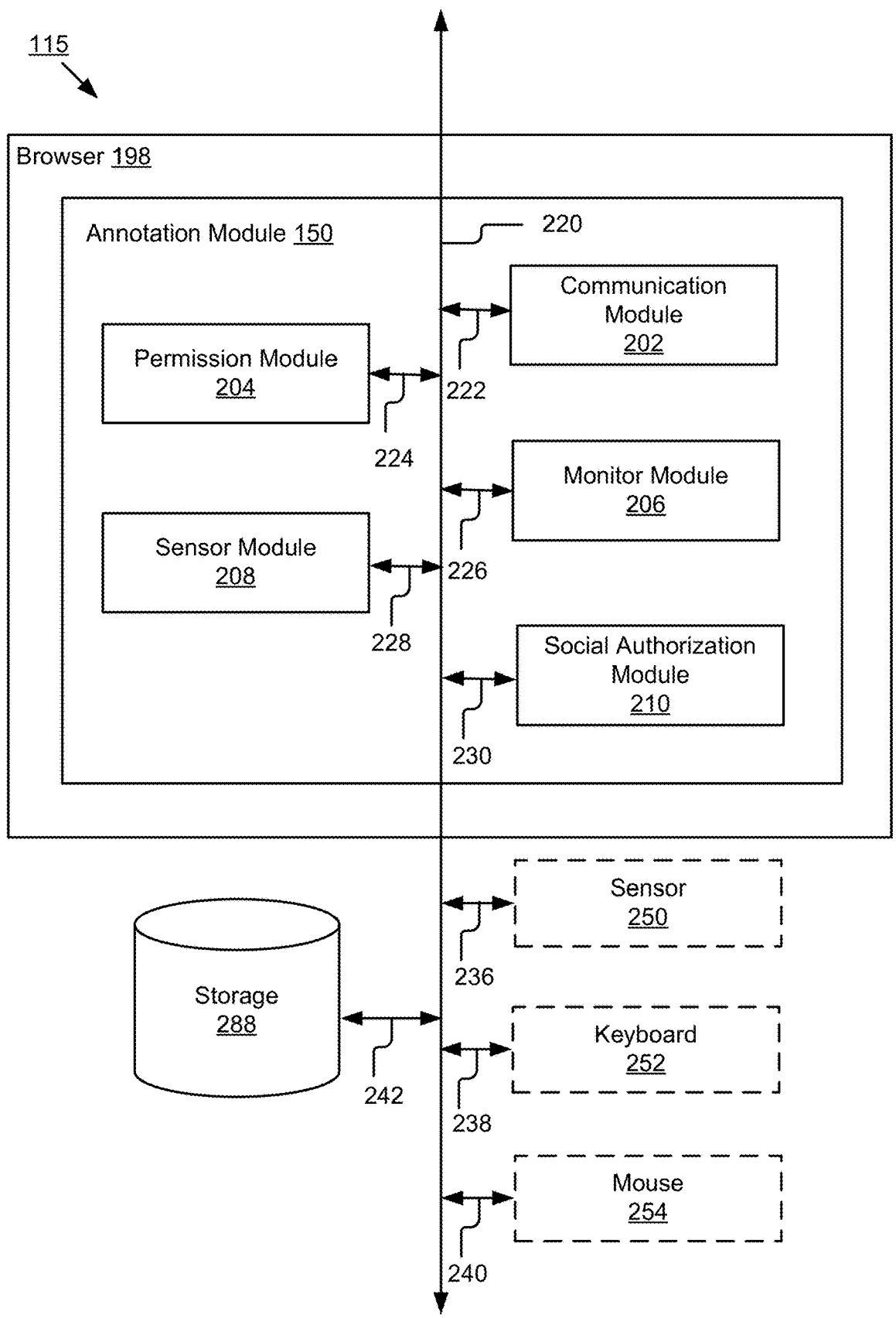
FIG. 2 is a block diagram illustrating one embodiment of a client device where an annotation module is illustrated in detail.

Referring now to FIG. 2, depicted is an embodiment of the client device 115 showing the annotation module 150 in more detail. Specifically, FIG. 2 depicts the storage 288, a sensor 250, a keyboard 252, a mouse 254 and the browser 198 including the annotation module 150. In one embodiment, the client device 115 also includes a processor (not pictured) and a memory (not pictured).

In one embodiment, the processor (not pictured) is a computer processor of the client device 115, and can be used to execute code and routines. The processor comprises an arithmetic logic unit, a microprocessor, a general purpose controller or some other processor array to perform computations and execute code and routines. The processor is coupled to the bus 220 for communication with the other components of the client device 115. The processor processes data signals and may comprise various computing architectures including a complex instruction set computer (CISC) architecture, a reduced instruction set computer (RISC) architecture, or an architecture implementing a combination of instruction sets. Multiple processors may be included in the client device 115. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory (not pictured) is a non-transitory storage medium. The memory stores instructions and/or data that may be executed by the processor. For example, in one embodiment, the memory stores the annotation module 150. The memory is communicatively coupled to the bus 220 for communication with the other components of the client device 115. In one embodiment, the instructions and/or data stored on the memory comprises code for performing any and/or all of the techniques described herein. The memory is a dynamic random access memory (DRAM) device, a static random access memory (SRAM) device, flash memory or some other memory device known in the art. In one embodiment, the memory also includes a non-volatile memory or similar permanent storage device and media such as a hard disk drive, a floppy disk drive, a CD-ROM device, a DVD-ROM device, a DVD-RAM device, a DVD-RW device, a flash memory device, or some other non-volatile storage device known in the art. In one embodiment, the memory stores the annotation module 150 and the sub-modules 202, 204, 206, 208 and 210 that are included in the annotation module 150.

The storage 288 is a non-transitory storage medium. For example, the storage 288 is any memory. The storage 288 stores data necessary for the annotation module 150 to perform its function. For example, the storage 288 stores annotation data received from users 125 for storage or buffering.

The sensor 250, keyboard 252 and the mouse 254 are depicted using dotted lines to indicate that they are optional elements of the client device 115. In one embodiment, the client device 115 includes any combination of the sensor 250, keyboard 252 and the mouse 254. For example, the client device 115 includes the keyboard 252 and the mouse 254, but does not include the sensor 250. In another example, the client device 115 includes the sensor 250. In one embodiment, the sensor 250 includes a microphone, a web camera, a video camera, a motion sensor and any similar audio or video capture device. For example, the sensor 250 includes an audio-to-text device.

Although one sensor 250, one keyboard 252 and one mouse 254 are shown with reference to the client device 115, persons having ordinary skill in the art will recognize that any number of sensors, keyboards and mouses may be included in the client device 115. Although a sensor 250, a keyboard 252 and a mouse 254 are shown with reference to the client device 115, persons having ordinary skill in the art will recognize that any input device to input data into a user interface may be included in the client device 115. For example, the client device 115 includes a track ball. In another example, the client device 115 includes a presence-detecting device. In yet another example, the client device 115 is a television that includes a pointing device used on television.

In one embodiment, the annotation module 150 comprises a communication module 202, a permission module 204, a monitor module 206, a sensor module 208 and a social authorization module 210.

In one embodiment, the communication module 202, permission module 204, monitor module 206, sensor module 208, social authorization module 210, sensor 250, keyboard 252, mouse 254 and storage 288 are communicatively coupled to a bus 220. The communication module 202 is communicatively coupled to the bus 220 via a signal line 222. The permission module 204 is communicatively coupled to the bus 220 via a signal line 224. The monitor module 206 is communicatively coupled to the bus 220 via a signal line 226. The sensor module 208 is communicatively coupled to the bus 220 via a signal line 228. The social authorization module 210 is communicatively coupled to the bus 220 via a signal line 230. The sensor 250 is communicatively coupled to the bus 220 via a signal line 236. The keyboard 252 is communicatively coupled to the bus 220 via a signal line 238. The mouse 254 is communicatively coupled to the bus 220 via a signal line 240. The sensor 288 is communicatively coupled to the bus 220 via a signal line 242.

In one embodiment, browser 198 does not include a bus 220 and the communication module 202, permission module 204, monitor module 206, sensor module 208, social authorization module 210, sensor 250, keyboard 252, mouse 254 and storage 288 are not communicatively coupled to the bus 220.

The communication module 202 includes code and routines for handling communications between the permission module 204, the monitor module 206, the sensor module 208, the social authorization module 210 and the other components of the client device 115. In one embodiment, the communication module 202 is stored in the memory (not pictured) and is accessible and executable by the processor (not pictured). The communication module 202 is adapted for cooperation and communication with the processor and other components of the client device 115 via signal line 222. The communication module 202 is communicatively coupled to the bus 220 via signal line 222.

In one embodiment, the communication module 202 receives video content from the video serving module 104 via the network 105. The communication module 202 delivers the video content to the permission module 204. For example, when a user 125 requests to view a video, the video serving module 104 sends the video content to the browser 198 of the client device 115 to display the video content for the user 125. In one embodiment, the video serving module 104 also sends the video content including permission data to the communication module 202 of the annotation module 150. In another embodiment, the video serving module 104 sends the permission data associated with the video to the communication module 202. The communication module 202 receives the video content and the permission data from the video serving module 104. The communication module 202 delivers the video content and the permission data to the permission module 204.

In one embodiment, the communication module 202 receives an annotation event from the monitor module 206. The communication module 202 transmits the annotation event to the annotation server module 152 via the network 105. In another embodiment, the communication module 202 transmits annotation data received from the monitor module 206 and/or sensor module 208 to the annotation server module 152 via the network 105.

The permission module 204 includes code and routines for determining whether an annotation for a video is permitted by its owner (or publisher). In one embodiment, the permission module 204 is a set of instructions executable by the processor of the client 115 to provide the functionality described below for determining whether an annotation for a video is permitted by its owner or publisher. In another embodiment, the permission module 204 is stored in the memory and is accessible and executable by the processor. In either embodiment, the permission module 204 is adapted for cooperation and communication with the processor and other components of the client device 115 via signal line 224. The permission module 204 is communicatively coupled to the bus 220 via signal line 224.

In one embodiment, the permission module 204 receives video content from the communication module 202. For example, a video is requested by a user 125 of the client device 115. The permission module 204 receives the video content from the video serving module 104 via the communication module 202. In one embodiment, the video content includes permission data indicating whether an annotation for the video content is permitted by the owner or publisher of the video content. The permission module 204 retrieves the permission data from the video content. The permission module 204 then determines whether an annotation for the video content is permitted by the owner or publisher of the video content based at least in part on the permission data. In one embodiment, the permission module 204 determines that an annotation for the video content is permitted based at least in part on the permission data. The permission module 204 sends the determination that an annotation for the video content is permitted to the monitor module 206.

In one embodiment, the permission data also includes one or more detail specifications describing permission for annotating a video. In one embodiment, the one or more detail specifications describe one or more certain types of annotations allowed by the owner or publisher to be added to a video. For example, a detail specification indicates that the owner of a video only allows text annotations to be added to the video content. In another embodiment, the one or more detail specifications include one or more certain positions and certain time portions of the video allowed by the owner or publisher to be annotated in. For example, a detail specification indicates that only annotations beside the video content are permitted by the owner of the video. In yet another embodiment, the one or more detail specifications include the number of annotations permitted by the owner or publisher of the video. For example, a detail specification specifies that an owner of a video permits no more than five annotations for its video.

In one embodiment, the permission module 204 transmits permission data to the monitor module 206. In another embodiment, the permission module 204 sends permission data to the storage 288 for storage or buffering.

The monitor module 206 includes code and routines for monitoring user activity, deriving an annotation event and receiving annotation data. In one embodiment, the monitor module 206 is a set of instructions executable by the processor to provide the functionality described below for monitoring user activity, deriving an annotation event and receiving annotation data. In another embodiment, the monitor module 206 is stored in the memory of the client 115 (not pictured) and is accessible and executable by the processor of the client 115 (not pictured). In either embodiment, the monitor module 206 is adapted for cooperation and communication with the processor and other components of the client device 115 via signal line 226. The monitor module 206 is communicatively coupled to the bus 220 via signal line 226.

In one embodiment, the monitor module 206 receives a determination that an annotation for video content is permitted from the permission module 204. The monitor module 206 begins monitoring user activity before, during and after a period in which the browser 198 (or media player) of the client 115 plays back the video content. The user activity includes any activity captured by an input device coupled to the client device 115 including a sensor, a keyboard, a mouse, etc. For example, the user activity is a sound captured by a microphone such as a sound of clapping hands and/or a whistle. In another example, the user activity is an action of human gestures captured by a motion sensor. In yet another example, the user activity is a mouse-over on the video content currently being played.

In one embodiment, once the monitor module 206 receives a user input responsive to a gesture and derives whether the user input is an annotation event. An annotation event indicates a request for annotating a video. In one embodiment, the monitor module 206 derives an annotation event based on a pre-determined standard. For example, if the monitor module 206 detects that a predetermined action of a human gesture (e.g., waving a hand, making a facial expression, etc.) captured by a web camera lasts more than three seconds, the monitor module 206 determines that this action is an annotation event.

In one embodiment, the monitor module 206 transmits the annotation event to the annotation server module 152 via the network 105. The annotation server module 152 sends a request for GUI data to the GUI module 126 based on the annotation event. The GUI module 126 transmits the GUI data to the browser 198 via the network 105. The browser 198 receives the GUI data and displays the GUI data in a user interface. The user interface is used by the annotating user 125 to input annotation data. The monitor module 206 receives the annotation data from the annotating user 125 via the user interface.

In another embodiment, the monitor module 206 transmits the annotation event to the sensor module 208. The sensor module 208 detects a sensor based on the annotation event.

In one embodiment, the annotation data received by the monitor module 206 includes position data, time data and annotation content data. The position data indicates one or more specific positions on the screen where annotation content will be added. For example, the position data specifies one or more positions inside the window showing the video content specified by the annotating user 125. In another example, the position data indicates a position on the screen of a monitor connected to the client 115 that is outside the window showing the video content. In yet another example, the position data indicates a position partially inside and partially outside the window showing the video content. The time data indicates the time portion of the video when the annotation content will appear and when it will disappear. For example, the time data specifies an annotation appears at the 3:00 minute mark of the video content and disappears at the 3:15 minute mark.

In one embodiment, the annotation content data includes any combination of different types of annotation content. For example, the annotation content includes one or more of a text annotation, an emoticon, a drawing, an image, an sketch, an audio, a streaming feed, a video (such as a streaming video), etc. For example, the annotation content data includes an image of a line drawing uploaded by the user 125 and an audio track that describes how the line drawing relates to the video content. In another example, the annotation content data includes semi-transparent images or images with various degrees of transparency. In one embodiment, the annotation content data includes any overlaying visual data that makes an annotation discernible. For example, the annotation content data includes semi-transparent videos and videos with various degrees of transparency. In another example, the annotation content data includes an overlaying visual data that makes the blue component of the color in the video content pink where the overlaying visual data overlaps the video content. In another embodiment, the annotation content data includes any combination of audio data that makes an annotation discernible. For example, the annotation data includes any combination of an audio with a different language from the language in the video content, an audio with a different voice (such as a celebrity's voice), an audio with a volume higher or lower than that of the video content, an audio with a shifted frequency or a shifted speed, etc.

As an example for annotation data, the annotating user 125 selects an area of the screen using a pointing device coupled to the client device 115. The annotating user 125 then uploads a pre-selected content to the client device 115 through the user interface. For example, the pre-selected content is a pre-selected text file or a pre-recorded audio or video file. The monitor module 206 receives the selected area of the screen as position data. The monitor module 206 receives the pre-selected content as annotation content data.

As another example for annotation data, the annotating user 125 draws shapes of different colors as annotation using a pointing device or a presence-detecting device coupled to the client device 115. The monitor module 206 receives the drawings as annotation content data by following the movements of the pointing device or the presence-detecting device. The monitor module 206 also detects the positions of the drawings on the screen. The monitor module 126 receives the positions of the drawings as position data.

In one embodiment, while the annotators 125 are inputting annotation data, they may pause the video content, stop it, leave it playing or change the playback speed of the video. The monitor module 206 receives annotation data even if the video content is paused or stopped. In one embodiment, the annotating user 125 inputs annotation content data while the video content is playing in a specific time portion. The monitor module 206 detects the specific time portion during which the video content is playing. The monitor module 206 receives the specific time portion as time data.

In one embodiment, the monitor module 206 sends the annotation data to the storage 288 for storage or buffering. In another embodiment, the monitor module 206 transmits the annotation data to the annotation server module 152 via the network 105.

The sensor module 208 includes code and routines for detecting one or more sensors and receiving annotation data. In one embodiment, the sensor module 208 is a set of instructions executable by the processor to provide the functionality described below for detecting one or more sensors and receiving annotation data. In another embodiment, the sensor module 208 is stored in the memory and is accessible and executable by the processor. In either embodiment, the sensor module 208 is adapted for cooperation and communication with the processor and other components of the client device 115 via signal line 228. The sensor module 208 is communicatively coupled to the bus 220 via signal line 228.

In one embodiment, the sensor module 208 receives an annotation event from the monitor module 206. The sensor module 208 detects whether a sensor is included or coupled to the client device 115 based on the annotation event. For example, a sensor includes a motion sensor, a microphone, a web camera and any similar video or audio capture device. In one embodiment, the sensor module 208 detects that a sensor is coupled to the client device 115. The sensor module 208 then receives one or more user inputs from the sensor as annotation data. For example, a user 125 says, "this is awesome" to a microphone while a video is playing. The sensor module 208 receives the audio input of the user 125 saying, "this is awesome" as annotation content data. The sensor module 208 also determines that the audio input of, "this is awesome" is to be added to the time portion of the video when the user 125 says it.

Examples for the annotation data from a sensor include audio, visual or video inputs of an annotating user 125 captured by a sensor coupled to the client device 115 such as a microphone, a camera, a motion sensor, etc. For example, an annotating user 125 who is watching a first video on a browser records a second video via a camera coupled to the client device 115 as annotation content for the first video. The sensor module 208 receives the second video recorded by the annotating user 125 as annotation content data. In one embodiment, the annotation content data also includes data indicating whether the second video will replace, appear in-between or appear in addition to the first video. In one embodiment, the sensor module 208 also receives the position and the time portion of the first video that the annotating user 125 wants the second video to be added to. For example, the annotating user 125 inputs the position data and time data by speaking into a microphone a position and a time portion. The sensor module 208 receives position data and time data inputted by the annotating user 125. For example, the position data and the time data indicate that the second video will be added to the left corner of the first video from time 5:00 to 6:30.

In one embodiment, the sensor module 208 derives annotation data based at least in part on a user activity. For example, the user activity includes a mouse clicking, a mouse moving, a movement captured by an input device (such as waiving a hand), a sound captured by an input device (such as a whistle or hand clapping), etc. The sensor module 208 receives the user activity. The sensor module 208 then derives annotation data including annotation content data, position data and time data based on the user activity.

In one embodiment, the sensor module 208 transmits the annotation data to the annotation server module 152 via the network 105. In another embodiment, the sensor module 208 sends the annotation data to the storage 288 for storage or buffering.

The social authorization module 210 includes code and routines for requesting social data from the user 125 of the client device 115. In one embodiment, the social authorization module 210 is a set of instructions executable by the processor to provide the functionality described below for requesting social data from user 125 of the client device 115. In another embodiment, the social authorization module 210 is stored in the memory and is accessible and executable by the processor. In either embodiment, the social authorization module 210 is adapted for cooperation and communication with the processor and other components of the client device 115 via signal line 230. The social authorization module 210 is communicatively coupled to the bus 220 via signal line 230.

In one embodiment, the social authorization module 210 requests social data from an annotating user 125. For example, after annotation data is received, the social authorization module 210 generates a request for information describing one or more social contacts of the annotating user 125. The social authorization module 210 transmits the request for information describing one or more social contacts of the annotating user 125 to the social module 174 via the network 105. The social module 174 sends the information describing one or more social contacts of the annotating user 125 to the GUI module 126. The GUI module 126 retrieves GUI data for generating a user interface used by the annotating user 125 to provide a selection of the one or more social contacts. For example, the user interface shows a list of the one or more social contacts of the annotating user 125. Each social contact in the list is able to be selected as authorized. The GUI module 126 transmits the GUI data for generating the user interface to the browser 198 through the network 105. The browser 198 displays the GUI data via the user interface to the annotating user 125.

In one embodiment, the user interface includes groups of social contacts with different privacy levels. For example, the user interface shows four groups such as family, friends, acquaintances and followers. By choosing one group, the annotating user 125 authorizes the social contacts in the group to view the annotation. In another embodiment, the user interface provides components allowing the annotating user 125 to authorize different social contacts to view different annotations. For example, the user interface allows the annotating user 125 to authorize friends to view text annotations and authorize family to view audio and video annotations.

In one embodiment, once the annotating user 125 provides data describing authorization through the user interface, the social authorization module 210 receives the data describing authorization as social data. For example, the annotating user 125 selects one or more social contacts as authorized to view the annotation. The social authorization module 210 receives data describing the one or more authorized social contacts as social data.

The social authorization module 210 transmits the social data to the annotation server module 152 via the network 105. In one embodiment, the social authorization module 210 sends the social data to the storage 288 for storage or buffering.

Annotation Data Storage 188

Figure 3:
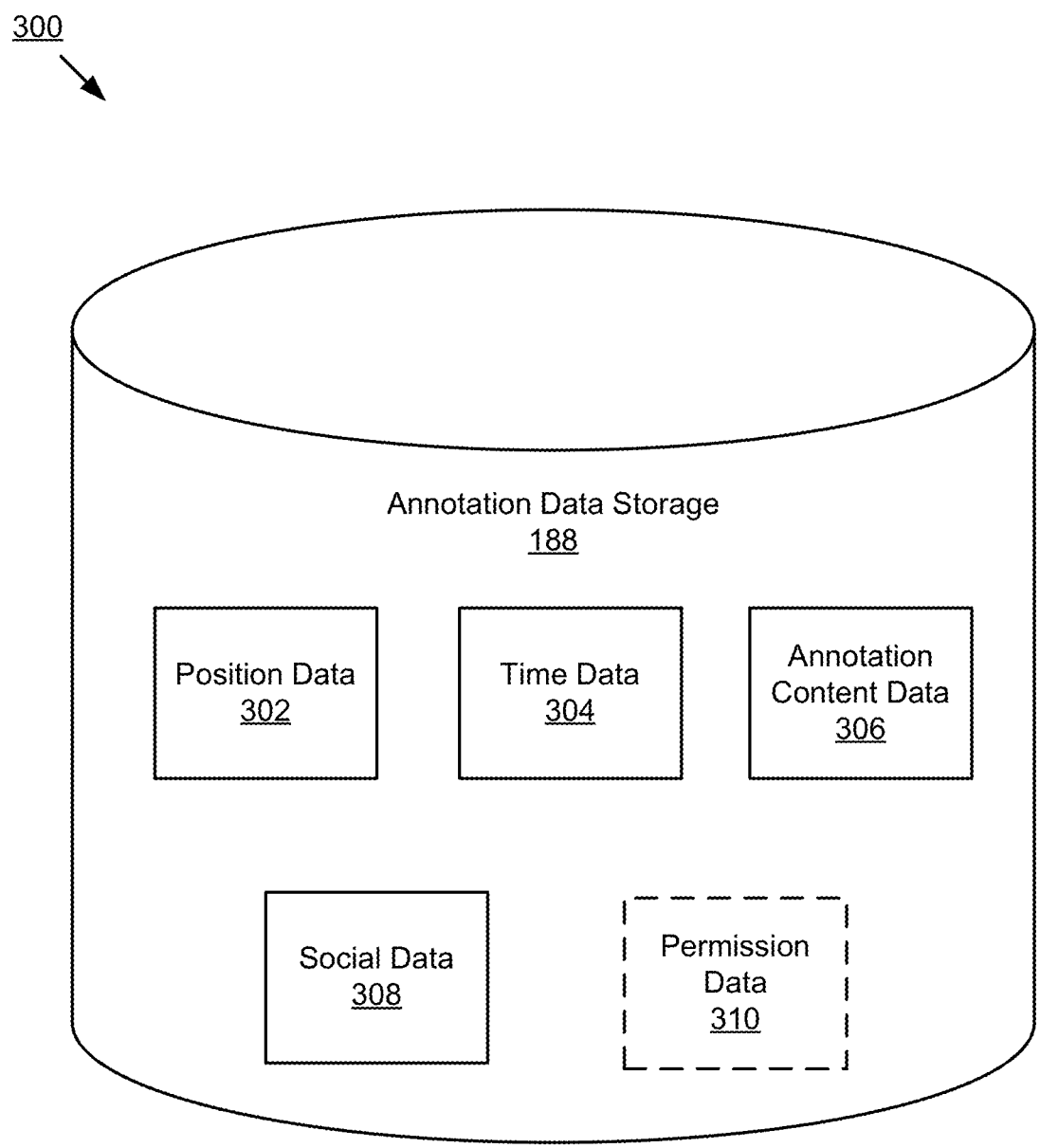
FIG. 3 is a block diagram illustrating one embodiment of an annotation data storage.

FIG. 3 is a block diagram 300 illustrating one embodiment of the annotation data storage 188. In the depicted embodiment, the annotation data storage 188 includes position data 302, time data 304, annotation content data 306, social data 308 and permission data 310. Persons of ordinary skill in the art will recognize that the annotation data storage 188 may store additional data not depicted in FIG. 3. For example, the annotation data storage 188 also stores one or more annotations such as annotation overlays for videos.

The position data 302 is data describing one or more positions on the screen where annotation content for a video will be added. For example, the monitor module 206 receives a user input from a pointing device such as a mouse. The user input specifies an area of the screen where an annotation for a video will appear. The area of the screen could be an area inside the video content, an area outside the video content (such as an area beside the video content) or an area partially inside and partially outside the video content. The monitor module 206 sends the user input data describing the area of the screen where the annotation for the video will appear to the asset hosting site 100. The position data 302 stores the data describing the area of the screen where the annotation for the video will appear. In another example, the user input data is received by the sensor module 208. In one embodiment, the position data 302 also stores associations between positions and annotations. In this way, the position data 302 stores data used by the annotation server module 152 to determine where annotations are added on the screen.

The time data 304 is data describing one or more time portions of a video when an annotation will appear and when it will disappear. For example, the monitor module 206 or the sensor module 208 receives a user input indicating a time portion of a video when an annotation lasts. The time portion could be a time portion in between the video or a time portion in addition to the video. The monitor module 206 or the sensor module 208 sends the user input data describing the time portion of the video when the annotation lasts to the asset hosting site 100. The time data 304 stores data describing the time portion of the video when the annotation lasts. In one embodiment, the time data 304 also stores associations between time portions and annotations. In this way, the time data 304 stores data used by the annotation server module 152 to determine when annotations are added and when annotations are removed.

The annotation content data 306 is data describing content of one or more annotations for a video. For example, the annotation content data 306 stores variety of annotation content such as a text annotation, an emoticon, a drawing, an image, an audio, a video, etc. In one embodiment, the annotation content is received from the monitor module 206. In another embodiment, the annotation content is received form the sensor module 208.

In one embodiment, the annotation content data 306 also stores data describing whether the annotation content is used to replace the video content or is added in addition to the video content. Therefore, the annotation content data 306 stores data used by the annotation server module 152 to determine what annotation content is added to a video and how it is added to the video.

The social data 308 is data specifying who is authorized by annotators to see annotations. For example, the social authorization module 210 receives a selection of one or more social contacts via a user interface from an annotating user 125. The one or more social contacts are, for example, specified by a social graph included in the social server 170 as connected to the annotating user 125. The social authorization module 210 sends the selection of one or more social contacts to the asset hosting site 100. The social data 308 stores data describing the one or more social contacts. In one embodiment, the social data 308 also stores associations between videos, annotators 125, annotations and one or more social contacts. In this way, the social data 308 stores data used by the annotation server module 152 to determine whom it will serve one or more annotations to.

The permission data 310 is depicted using a dotted line to indicate that the permission data 310 is an optional element of the annotation data storage 188. In one embodiment, the permission data 310 is an element of the video database 116 and not an element of the annotation data storage 188.

The permission data 310 is data specifying whether an annotation for a video is permitted by the owner or publisher of the video. In one embodiment, the permission data 310 stores one or more detail specifications describing one or more certain types of annotations permitted by the owner or publisher to be added to video. In another embodiment, the permission data 310 stores one or more detail specifications describing one or more certain positions and certain time portions of a video permitted by the owner or publisher to be annotated in. In yet another embodiment, the permission data 310 stores one or more detail specifications describing the number of annotations permitted by the owner or publisher of a video.

Methods

FIGS. 4-6C depict various methods 400, 500 and 600 performed by the system described above with reference to FIGS. 1-2.

Figure 4:
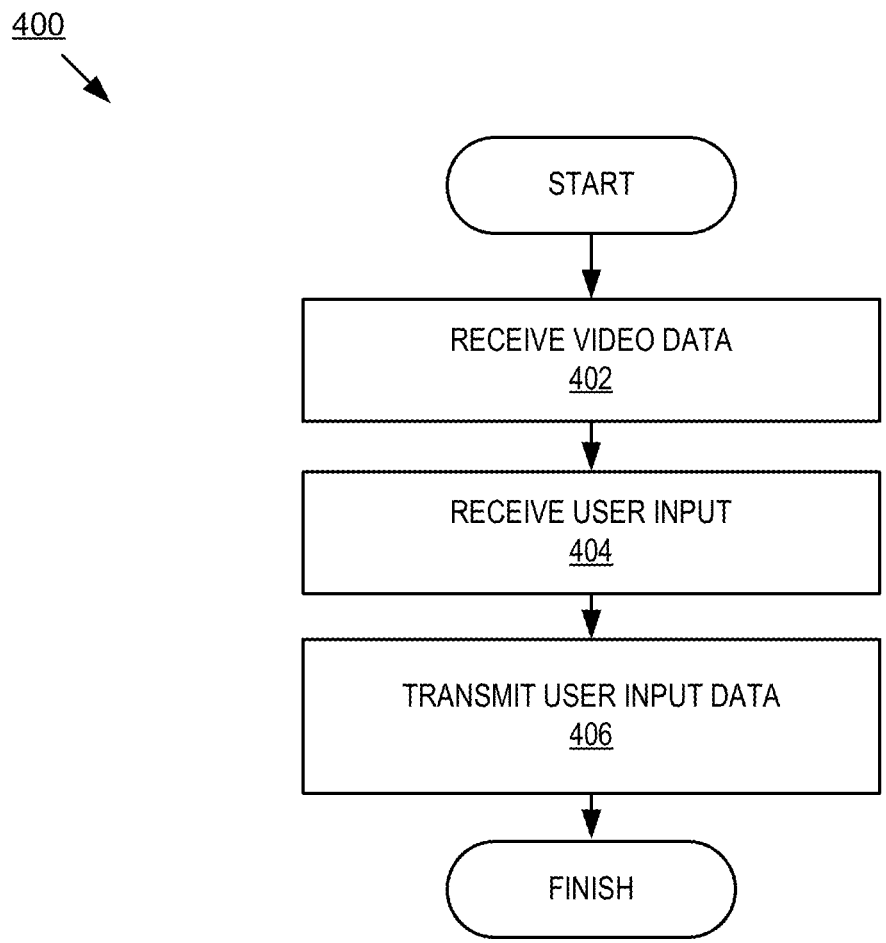
FIG. 4 is a flow diagram of one embodiment of a method for providing annotation data for video content.

FIG. 4 is a flow diagram depicting one embodiment of a method 400 for providing annotation data for video content. The annotation module 150 receives 402 video data. For example, the video serving module 104 sends video data to the client device 115 responsive to a request of a user 125 using the client device 115. The annotation module 150 receives video data from the video serving module 104 via the network 105.

At step 404, the annotation module 150 receives user input. For example, the annotation module 150 receives one or more user inputs from a sensor such as a motion sensor, a web camera, a microphone, etc. The one or more user inputs include annotation data such as position data, time data and annotation content data. In one embodiment, the annotation data also includes social data specifying one or more social contacts that are authorized to see the annotation.

At step 406, the annotation module 150 transmits user input data to the asset hosting site 100. For example, the annotation module 150 transmits annotation data including position data, time data, annotation content data and social data to the annotation server module 152 to present annotation for video content to users 125.

Figure 5A:
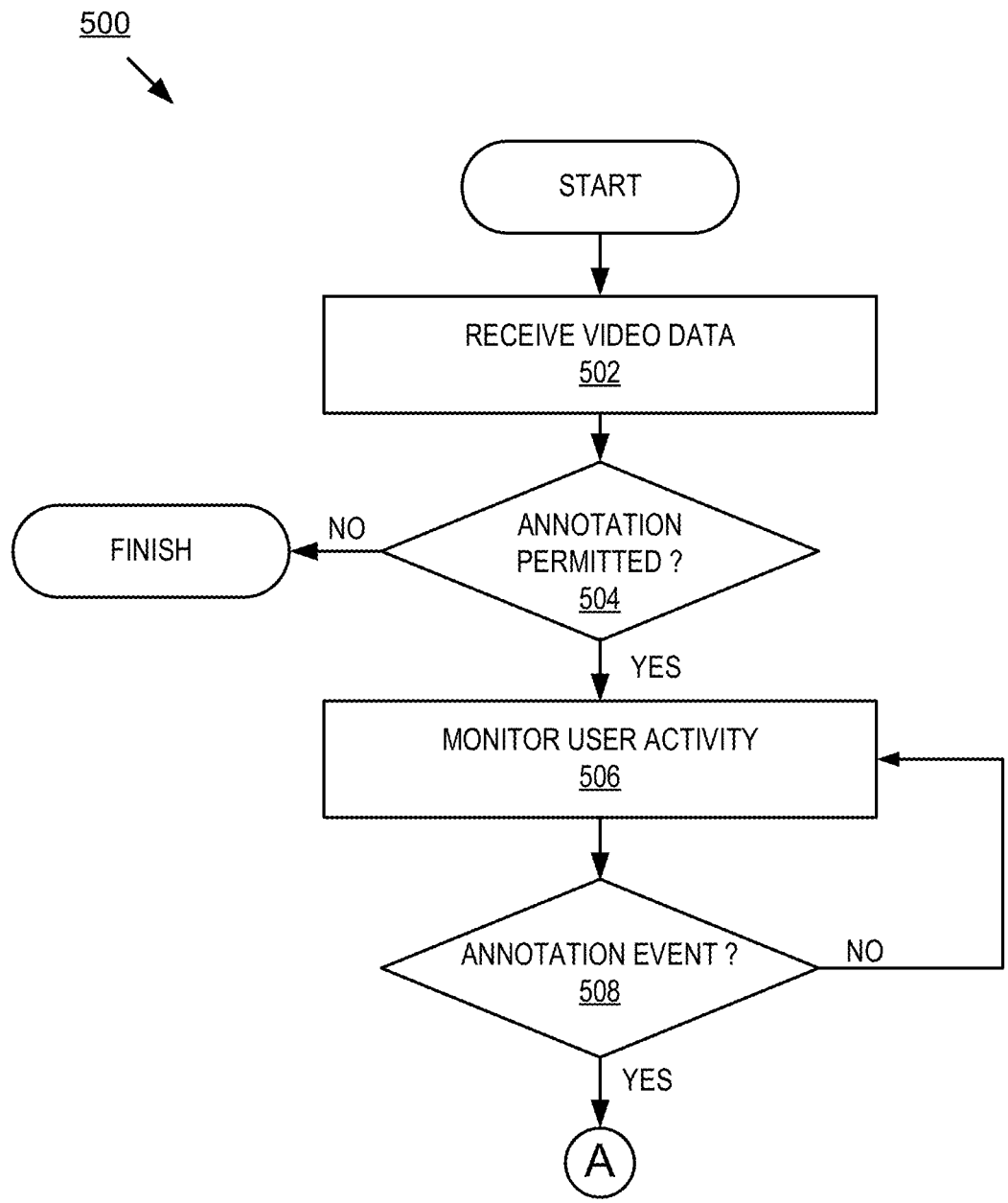
FIGS. 5A-5B are flow diagrams of another embodiment of a method for providing annotation data for video content.
Figure 5B:
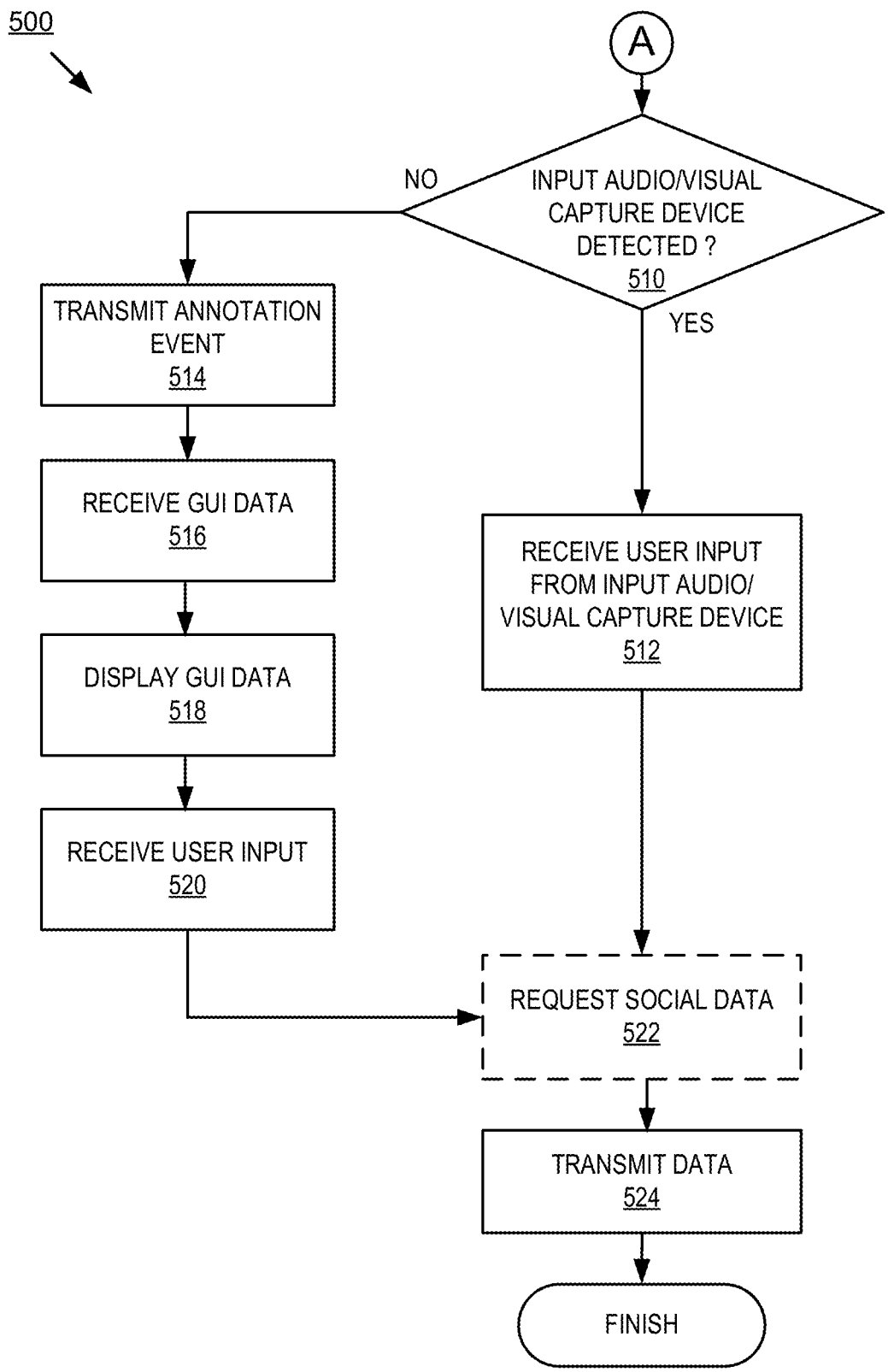

FIGS. 5A-5B are flow diagrams depicting another embodiment of a method 500 for providing annotation data for video content. The permission module 204 receives 502 video data. For example, the video serving module 104 sends video data to the browser 198 on the client device 115 responsive to a request from a user 125 operating on the client device 115. The video serving module 104 also sends the video data to the communication module 202 of the annotation module 150. The communication module 202 delivers the video data to the permission module 204. The permission module 204 receives the video data from the communication module 202. In one embodiment, the video data also includes permission data.

At step 504, the permission module 204 determines whether an annotation is permitted. For example, the permission module 204 retrieves permission data from the video data. The permission module 204 determines whether an annotation for the video is permitted by the owner or publisher of the video based at least in part on the permission data. If an annotation for the video is permitted, the method 500 proceeds to step 506. Otherwise, the method 500 ends.

At step 506, the monitor module 206 monitors user activity. For example, the monitor module 206 receives a determination that an annotation for a video is permitted from the permission module 204. Based at least in part on the determination, the monitor module 206 monitors user activity before, during and after playback of the video content. The user activity includes any activity captured by an input device coupled to the client device 115 such as a sensor (a microphone, a web camera, a motion sensor, etc.), a keyboard and a mouse.

At step 508, the monitor module 206 determines whether an activity is detected and derives whether an annotation event has occurred or is presently occurring. For example, the monitor module 206 receives a voice input saying, "I want to add an annotation" that is captured by a microphone coupled to the client device 115. In one embodiment, the monitor module 206 derives that the detected activity indicates a request for annotating the video. Therefore, the monitor module 206 derives that the detected activity indicates that an annotation event has occurred or is presently occurring. If an annotation event is derived, the method 500 proceeds to step 510. Otherwise, the method 500 moves back to step 506.

Referring to FIG. 5B, the sensor module 208 detects 510 an input audio or visual capture device. For example, the sensor module 208 detects whether an input audio or visual capture device is included or coupled to the client device 115. The input audio or visual capture device includes a motion sensor, a microphone, a camera (such as a web camera, a video camera, etc.), and any other similar input audio or visual capture device. If an input audio or visual capture device is detected, the method 500 proceeds to step 512.

At step 512, the sensor module 208 receives user input from the input audio or visual capture device. For example, a microphone coupled to the client device captures a voice input saying, "this is awesome" from a user 125. The sensor module 208 receives the voice input saying, "this is awesome" as annotation data.

If an input audio or visual capture device is not detected, the method 500 proceeds to step 514. At step 514, the monitor module 206 transmits an annotation event. For example, the monitor module 206 transmits an annotation event to the annotation server module 152 via the network 105. The annotation server module 152 sends a request for GUI data to the GUI module 126 based on the annotation event. The GUI module 126 transmits the GUI data to the browser 198 via the network 105.

At step 516, the browser 198 receives GUI data. For example, the browser 198 receives GUI data from the GUI module 126 via the network 105. At step 518, the browser 198 displays GUI data. For example, the browser 198 displays the GUI data received from the GUI module 126 via a user interface used by a user 125 such as an annotating user 125 to input annotation data.

At step 520, the monitor module 206 receives user input. For example, the monitor module 206 receives one or more user inputs through the user interface displaying the GUI data. The user input includes annotation data such as position data, time data and annotation content data.

At step 522, the social authorization module 210 requests social data. For example, the social authorization module 210 requests social data from an annotating user 125. The social data includes one or more social contacts of the annotating user 125 who are authorized by the annotating user 125 to see the annotation. This step 522 is depicted in FIG. 5B using a dotted line to indicate that this step 522 is an optional step in the method 500.

At step 524, the communication module 202 transmits data. For example, the communication module 202 transmits annotation data to the annotation server module 152 via the network 105. The annotation data includes position data, time data and annotation content data. In one embodiment, the annotation data also includes social data.

Figure 6A:
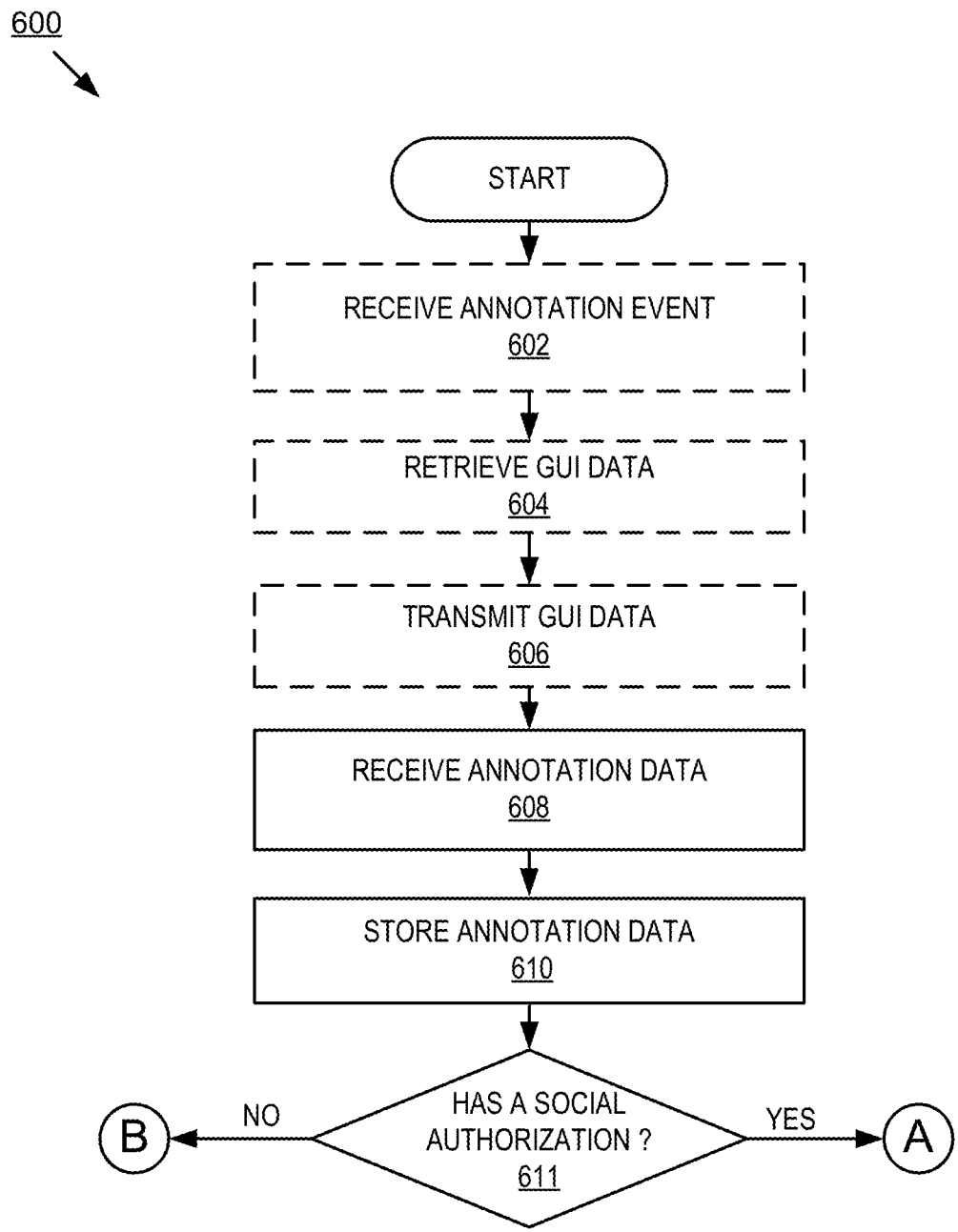
FIGS. 6A-6C are flow diagrams of one embodiment of a method for generating an annotation overlay for video content.
Figure 6B:
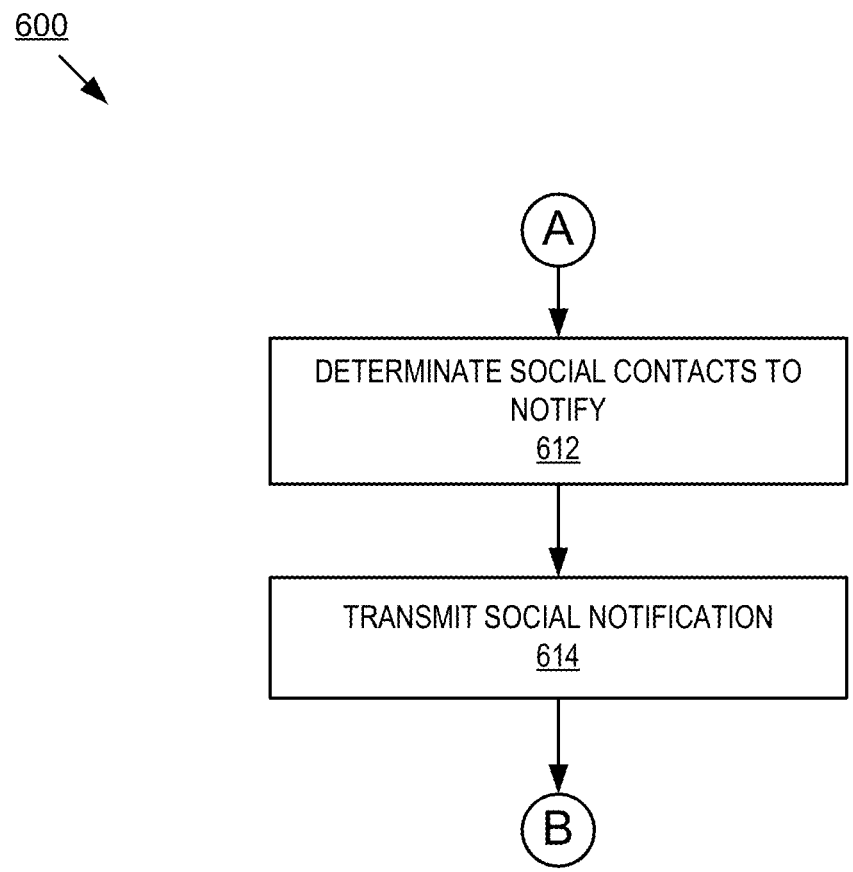
Figure 6C:
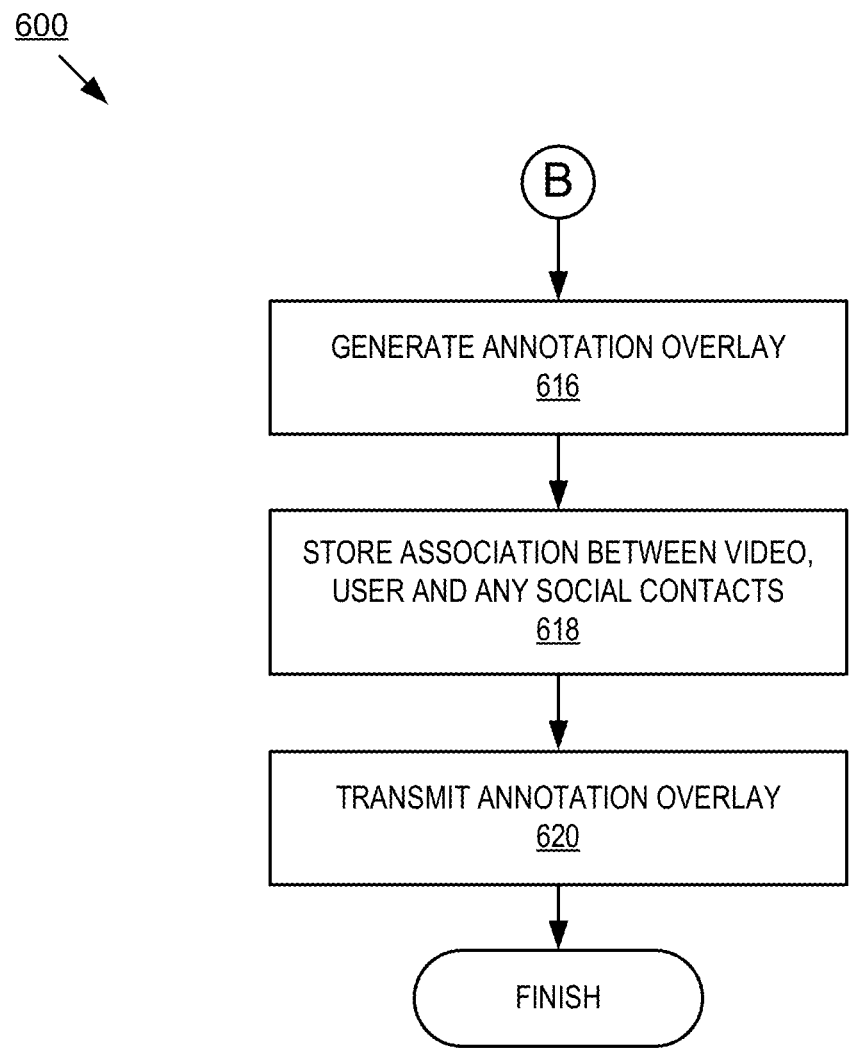

FIGS. 6A-6C are flow diagrams depicting one embodiment of a method 600 for generating an annotation overlay for video content. The annotation server module 152 receives 602 an annotation event. For example, the annotation server module 152 receives an annotation event from the annotation module 150 via the network 105. In one embodiment, the annotation server module 152 sends a request for GUI data to the GUI module 126 responsive to the annotation event.

At step 604, the GUI module 126 retrieves GUI data. For example, the GUI module 126 retrieves GUI data from the graphical data storage 194 responsive to a request from the annotation server module 152. In one embodiment, the GUI data is graphical data for generating a user interface used by an annotating user 125 to provide annotation data.

At step 606, the GUI module 126 transmits GUI data. For example, the GUI module 126 transmits the GUI data retrieved from the graphical data storage 194 to the browser 198 in the client device 115. The browser 198 generates a user interface to display the GUI data to the annotating user 125. The annotating user 125 inputs annotation data via the user interface. The annotation module 150 receives annotation data from the annotating user 125 via the user interface.

Steps 602-606 are depicted in FIG. 6A using dotted lines to indicate that they are optional steps for the method 600. In one embodiment, the method 600 starts at step 608.

At step 608, the annotation server module 152 receives annotation data. For example, the annotation server module 152 receives annotation data for a video from the annotation module 150 via the network 105. In one embodiment, the annotation data includes position data, time data and annotation content data. In another embodiment, the annotation data also includes social data.

At step 610, the annotation server module 152 stores annotation data. For example, the annotation server module 152 transmits the annotation data received from the annotation module 150 to the annotation data storage 188 for storage.

At step 611, the annotation server module 152 determines whether the annotation data has a social authorization. For example, the annotation server module 152 retrieves the social data from the annotation data. The annotation server module 152 determines whether an annotation generated using the annotation data is authorized to be viewed by other users 125 based at least in part on the social data. If the annotation server module 152 determines that the annotation data has a social authorization, the method 600 proceeds to step 612. Otherwise, the method 600 proceeds to step 616.

Referring to FIG. 6B, the social module 174 determines 612 social contacts to notify. For example, the social module 174 receives social data from the annotation server module 152. The social module 174 determines one or more social contacts authorized to view the annotation generated using the annotation data based at least in part on the social data.

At step 614, the social module 174 transmits social notification. In one embodiment, the social module 174 generates one or more social notifications based on the one or more authorized social contacts. The social module 174 transmits the one or more social notifications to the social server 170 to notify the one or more authorized social contacts. For example, the one or more authorized social contacts are friends of the annotating user 125 on a social network site hosted by the social server 170. The social module 174 transmits a social notification such as, "Your friend Ade annotated a video 'Aliens raise peaches'" to the social server 170 to display the social notification to the friends of the annotating user 125.

Referring to FIG. 6C, the annotation server module 152 generates 616 an annotation overlay. In one embodiment, the annotation server module 152 generates one or more annotations based at least in part on the annotation data. The one or more annotations include annotation content data (such as data for a text annotation, an emoticon, a drawing, an image, an audio and a video) in one or more positions and in one or more time portions of the video content specified by the position data and time data. For example, an annotation is provided as an annotation overlay.

At step 618, the annotation data storage 188 stores associations between video, user and any social contacts. For example, the annotation server module 152 transmits one or more associations between a video, a user 125 such as an annotating user 125 and any authorized social contacts of the annotating user 125 to the annotation data storage 188 for storage.

At step 620, the annotation server module 152 transmits annotation overlay. For example, the annotation server module 152 transmits the generated annotation such as an annotation overlay to the browser 198 in the client device 115. The browser 198 displays the annotation overlay on the video to users 125. In one embodiment, the annotation server module 152 sends the annotation overlay for the video to the annotation data storage 188 for storage.

Graphical User Interface Engine 126

Figure 7A:
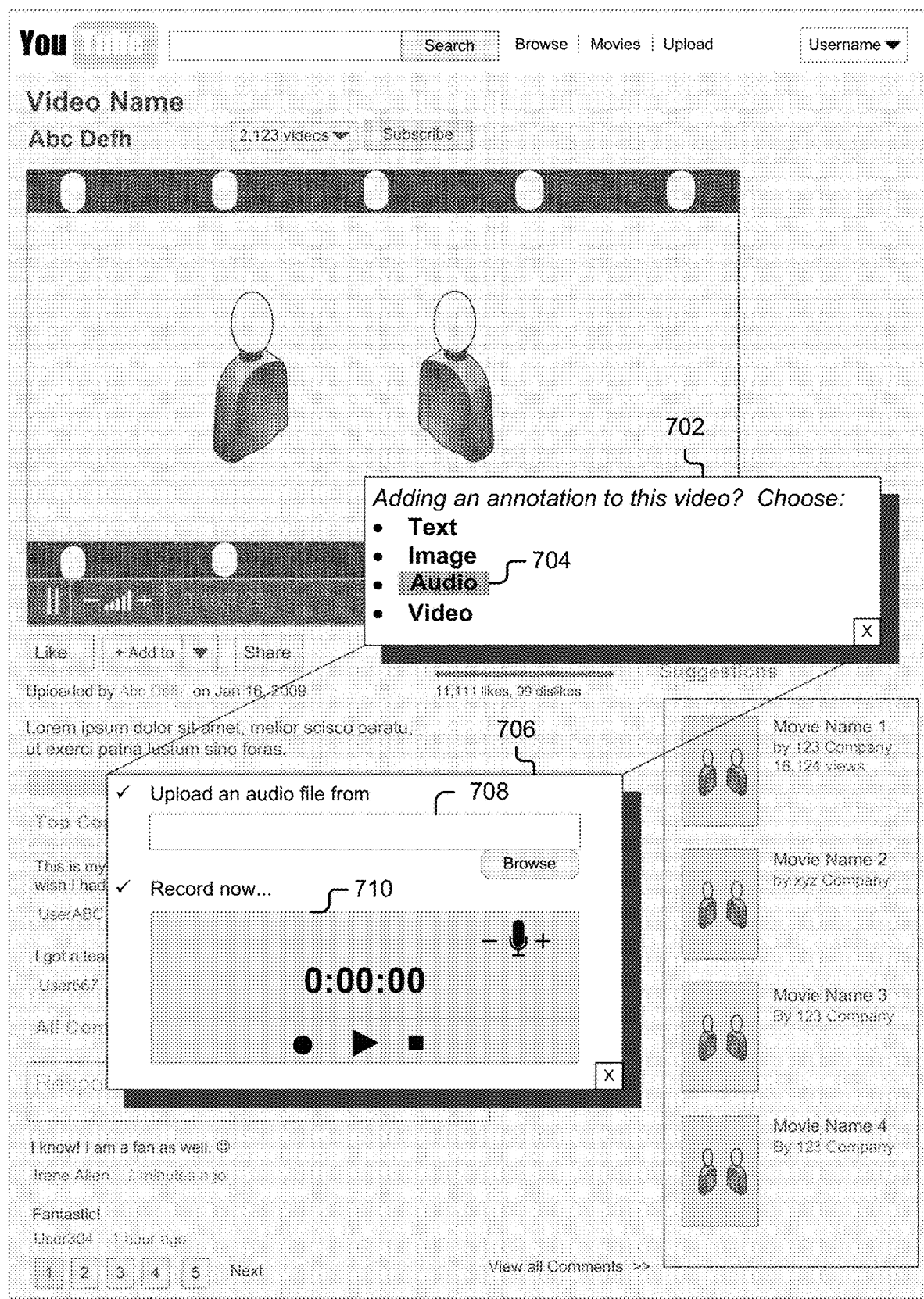
FIG. 7A is a graphic representation of a user interface that is generated by a GUI module for receiving annotation data from a user.
Figure 7B:
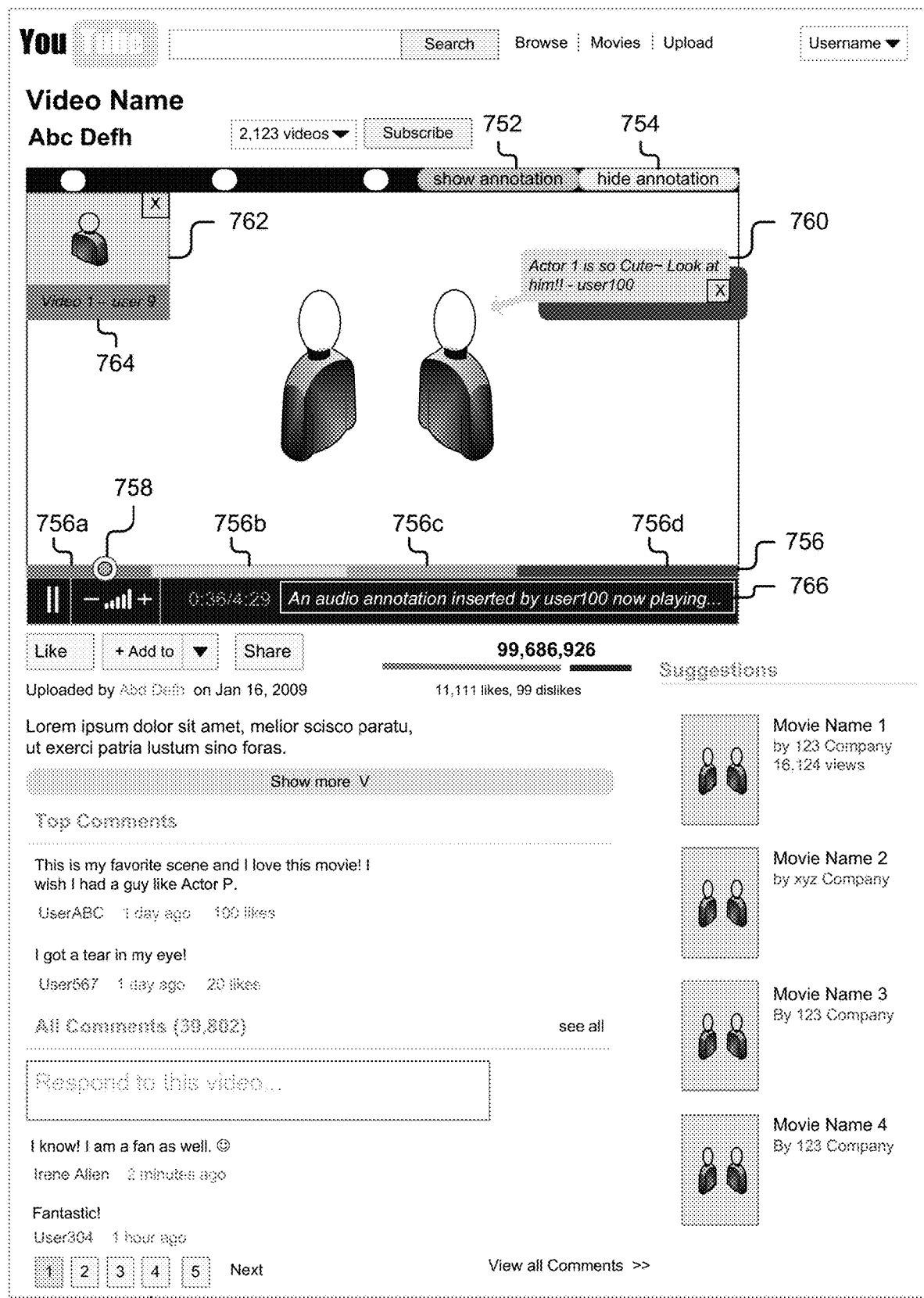
FIG. 7B is graphic representation of a user interface that is generated by a GUI module for displaying video content with annotations.

FIG. 7A is a graphic representation 700 of a user interface that is generated by the GUI module 126 for receiving annotation data from a user 125 according to one embodiment.

Element 702 is a graphic dialog box 702 for a user 125 to choose a type of annotation content to add to a video. The dialog box 702 includes four types of annotation content (e.g., text, image, audio and video.) Element 704 is an audio button 704 included in the dialog box 702. The audio button 704 is clickable by a user to cause the popup of an audio input box 706.

Element 706 is a graphical audio input box 706 for a user 125 to input audio annotation. Element 708 is a graphical box 708 for a user 125 to enter an address of an audio file. Element 710 is a graphical window 710 for recording an audio file. For example, the graphical window 710 is used by a user 125 operating on a client device 115 to record a speech of the user 125 through a microphone coupled to the client device 115.

FIG. 7B is a graphic representation 750 of another user interface that is generated by the GUI module 126 according to one embodiment. The user interface depicted in FIG. 7B is displaying video content with annotations. Element 752 is a graphical button 752 clickable by a user 125 to cause the showing of an annotation. Element 754 is a graphical button 754 clickable by a user 125 to cause the hiding of an annotation.

Element 756 is a graphical scroll bar 756 for indicating different annotations in different time portions of the video. Element 756*a*, 756*b*, 756*c* and 756*d* depict different portions of the graphical scroll bar 756 with different gray levels. For example, element 756*a* depicts a portion of the scroll bar 756 indicating that there are three different annotations in this time portion of the video. Element 756*b*, 756*c* and 756*d* depict portions of the scroll bar 756 indicating that there are one, two and four annotations in these three time portions of the video, respectively. Element 758 is a graphical button 758 that is moving along the scroll bar 756 as the video is playing. For example, the button 758 indicates the current time at which the video is playing. The button 758 can be scrolled along the scroll bar 756 by a user 125 to any time of the video.

Element 760 is a graphical text box 760 showing a text annotation. Element 762 is a graphical window 762 displaying a video annotation. Element 764 is a graphical box 764 depicting the title of the video annotation and the user identification for the annotating user 125 of the video annotation. Element 766 is a graphical message box 766 depicting a message. The message is an indication of appearance of an annotation. For example, the message indicates that an audio annotation inserted by a user 125 is now playing.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, from a first client device of an annotating user, annotation data that comprises a plurality of annotations and identifies timestamps indicating times during which the plurality of annotations are to be displayed during playback of a video;
   receiving, from a second client device of a viewing user, a preference of the viewing user identifying a first time portion for displaying annotations during the playback of the video and a second time portion for hiding annotations during the playback of the video;
   receiving, from the second client device of the viewing user, a request of the viewing user to view the video, wherein the request of the viewing user is associated with the preference of the viewing user, wherein the preference of the viewing user was received prior to receiving the request to view the video; and
   responsive to the request to view the video, transmitting, by a processing device, the video with one or more of the plurality of annotations to the second client device for the playback of the video with the one or more of the plurality of annotations in accordance with the annotation data of the annotating user and the preference of the viewing user, wherein any of the plurality of annotations with timestamps that correspond to the first time portion are to be displayed during the playback of the video and any of the plurality of annotations with timestamps that correspond to the second time portion are to be hidden during the playback of the video.

2. The method of claim 1 wherein the plurality of annotations comprise an audio annotation.

3. The method of claim 1, further comprising:
allowing the annotating user to annotate the video responsive to receiving permission data from a content provider of the video indicating that annotation of the video is permitted.

4. The method of claim 1, wherein the video is a live-stream video.

5. The method of claim 4, wherein the annotation data is received from the first client device concurrent to streaming of the live-stream video to the first client device.

6. A system comprising:
a memory; and
a processing device, coupled to the memory, the processing device to:
 receive, from a first client device of an annotating user, annotation data that comprises a plurality of annotations and identifies timestamps indicating times during which the plurality of annotations are to be displayed during playback of a video;
 receive, from a second client device of a viewing user, a preference of the viewing user identifying a first time portion for displaying annotations during the playback of the video and a second time portion for hiding annotations during the playback of the video;
 receive, from the second client device of the viewing user, a request of the viewing user to view the video, wherein the request of the viewing user is associated with the preference of the viewing user, wherein the preference of the viewing user was received prior to receiving the request to view the video; and
 responsive to the request to view the video, transmit the video with one or more of the plurality of annotations to the second client device for the playback of the video with the one or more of the plurality of annotations in accordance with the annotation data of the annotating user and the preference of the viewing user, wherein any of the plurality of annotations with timestamps that correspond to the first time portion are to be displayed during the playback of the video and any of the plurality of annotations with timestamps that correspond to the second time portion are to be hidden during the playback of the video.

7. The system of claim 6, wherein the plurality of annotations comprise at least one of an audio annotation, a video annotation, an image annotation, or a drawing annotation.

8. The system of claim 6, wherein the processing device is further to:
allow the annotating user to annotate the video responsive to receiving permission data from a content provider of the video indicating that annotation of the video is permitted.

9. The system of claim 6, wherein the processing device is further to:
transmit to a third client a notification indicating that the video has been annotated by the annotating user.

10. The system of claim 6, wherein the video is a live-stream video.

11. The system of claim 10, wherein the annotation data is received from the first client device concurrent to streaming of the live-stream video to the first client device.

12. A non-transitory computer-readable medium comprising instructions that, in response to execution by a processing device, cause the processing device to perform operations comprising:
 receiving, from a first client device of an annotating user, annotation data that comprises a plurality of annotations and identifies timestamps indicating times during which the plurality of annotations are to be displayed during playback of a video;
 receiving, from a second client device of a viewing user, a preference of the viewing user identifying a first time portion for displaying annotations during the playback of the video and a second time portion for hiding annotations during the playback of the video;
 receiving, from the second client device of the viewing user, a request of the viewing user to view the video, wherein the request of the viewing user is associated with the preference of the viewing user, wherein the preference of the viewing user was received prior to receiving the request to view the video; and
 responsive to the request to view the video, transmitting, by the processing device, the video with one or more of the plurality of annotations to the second client device for the playback of the video with the one or more of the plurality of annotations in accordance with the annotation data of the annotating user and the preference of the viewing user, wherein any of the plurality of annotations with timestamps that correspond to the first time portion are to be displayed during the playback of the video and any of the plurality of annotations with timestamps that correspond to the second time portion are to be hidden during the playback of the video.

13. The non-transitory computer-readable medium of claim 12, wherein the plurality of annotations comprise an audio annotation.

14. The non-transitory computer-readable medium of claim 12, wherein the operations further comprise:
 transmitting to a third client a notification indicating that the video has been annotated by the annotating user.

15. The non-transitory computer-readable medium of claim 12, wherein the plurality of annotations comprise at least one of an audio annotation, a video annotation, an image annotation, or a drawing annotation.

16. The non-transitory computer-readable medium of claim 12, wherein the video is a live-stream video.

17. The non-transitory computer-readable medium of claim 16, wherein the annotation data is received from the first client device concurrent to streaming of the live-stream video to the first client device.

18. The non-transitory computer-readable medium of claim 12, wherein the operations further comprise:
 receiving permission data associated with the video from a content provider, wherein the permission data indicates that annotation of the video is permitted.

19. The non-transitory computer-readable medium of claim 18, wherein the operations further comprise:
 allowing the annotating user to annotate the video in view of the permission data from the content provider.

* * * * *